US011575703B2

(12) United States Patent
Reybok, Jr. et al.

(10) Patent No.: US 11,575,703 B2
(45) Date of Patent: Feb. 7, 2023

(54) NETWORK SECURITY THREAT INTELLIGENCE SHARING

(71) Applicant: ServiceNow, Inc., Santa Clara, CA (US)

(72) Inventors: Richard Reybok, Jr., Fremont, CA (US); Kurt Joseph Zettel, II, Nashville, TN (US); Phillip Dicorpo, San Francisco, CA (US); Simon N. Allen, Santa Clara, CA (US); Amit Sharma, Cupertino, CA (US); Giora Tamir, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 323 days.

(21) Appl. No.: 16/555,975

(22) Filed: Aug. 29, 2019

(65) Prior Publication Data
US 2019/0394227 A1 Dec. 26, 2019

Related U.S. Application Data

(63) Continuation of application No. 15/588,152, filed on May 5, 2017, now abandoned.

(51) Int. Cl.
*H04L 29/06* (2006.01)
*H04L 9/40* (2022.01)
(Continued)

(52) U.S. Cl.
CPC ........ *H04L 63/1441* (2013.01); *G06F 16/951* (2019.01); *G06N 20/00* (2019.01);
(Continued)

(58) Field of Classification Search
CPC . H04L 63/1441; H04L 63/14; H04L 63/1416; H04L 63/1425; H04L 63/1433; G06F 16/951; G06N 20/00
See application file for complete search history.

(56) References Cited

U.S. PATENT DOCUMENTS 6,848,015 B2 1/2005 Jones
7,010,696 B1 3/2006 Cambridge et al.
(Continued)

FOREIGN PATENT DOCUMENTS

EP 3001345 A2 3/2016

OTHER PUBLICATIONS

Dimitrios Sisiaridis et al., A Framework for Threat Detection in Communication Systems, Nov. 2016, ACM, pp. 1-6. (Year: 2016).*
(Continued)

*Primary Examiner* — Luu T Pham
*Assistant Examiner* — Fahimeh Mohammadi
(74) *Attorney, Agent, or Firm* — Fletcher Yoder PC

(57) ABSTRACT

Systems and methods are disclosed for obtaining network security threat information and mitigating threats to improve computing network operations. For example, methods may include receiving a message from a central instance; from outside of a private network, invoking a search of data associated with the private network, wherein the search is based on the message and the search is performed by an agent device within the private network; receiving a search result of the search from the agent device; transmitting the search result to the central instance, wherein the central instance is configured to generate network security threat information based in part on the search result and share the network security threat information with a plurality of customer instances that are associated with a group of customers; and receiving an alert message from the central instance, wherein the alert message includes information that identifies a network security threat.

16 Claims, 9 Drawing Sheets

(51) Int. Cl.
 *G06N 20/00* (2019.01)
 *G06F 16/951* (2019.01)

(52) U.S. Cl.
 CPC .......... *H04L 63/14* (2013.01); *H04L 63/1416* (2013.01); *H04L 63/1425* (2013.01); *H04L 63/1433* (2013.01)

(56) References Cited

U.S. PATENT DOCUMENTS

| | | | |
|---|---|---|---|
| 7,028,338 B1* | 4/2006 | Norris | G06F 21/55 713/188 |
| 7,076,801 B2 | 7/2006 | Gong et al. | |
| 7,100,195 B1 | 8/2006 | Underwood | |
| 7,603,711 B2 | 10/2009 | Scheidell | |
| 7,644,365 B2 | 1/2010 | Bhattacharya et al. | |
| 8,239,668 B1 | 8/2012 | Chen et al. | |
| 8,321,944 B1 | 11/2012 | Mayer et al. | |
| 8,914,406 B1 | 12/2014 | Haugsnes et al. | |
| 9,038,183 B1 | 5/2015 | Haugsnes et al. | |
| 9,137,258 B2 | 9/2015 | Haugsnes | |
| 9,167,001 B1 | 10/2015 | Haugsnes et al. | |
| 2003/0105911 A1 | 6/2003 | Jones | |
| 2003/0133443 A1 | 7/2003 | Klinker et al. | |
| 2003/0154399 A1 | 8/2003 | Zuk et al. | |
| 2004/0221191 A1 | 11/2004 | Porras et al. | |
| 2005/0097256 A1 | 5/2005 | Jones | |
| 2005/0193429 A1 | 9/2005 | Demopoulos et al. | |
| 2006/0031476 A1 | 2/2006 | Mathes et al. | |
| 2007/0214220 A1 | 9/2007 | Alsop et al. | |
| 2007/0261112 A1 | 11/2007 | Todd et al. | |
| 2008/0034425 A1 | 2/2008 | Overcash et al. | |
| 2008/0162474 A1 | 7/2008 | Thong et al. | |
| 2008/0276098 A1 | 11/2008 | Florencio et al. | |
| 2009/0178139 A1* | 7/2009 | Stute | H04L 63/1433 726/22 |
| 2009/0210424 A1 | 8/2009 | Morohoshi | |
| 2009/0234970 A1* | 9/2009 | Sun | H04L 67/306 709/218 |
| 2009/0328209 A1 | 12/2009 | Nachenberg | |
| 2010/0114701 A1 | 5/2010 | Steelberg et al. | |
| 2010/0175132 A1 | 7/2010 | Zawadowskiy et al. | |
| 2010/0281457 A1* | 11/2010 | Ren | G06F 9/451 717/105 |
| 2011/0023119 A1 | 1/2011 | Rayes et al. | |
| 2011/0173699 A1* | 7/2011 | Figlin | H04L 63/1441 726/23 |
| 2012/0109802 A1 | 5/2012 | Griffin et al. | |
| 2012/0117509 A1 | 5/2012 | Powell et al. | |
| 2012/0159624 A1 | 6/2012 | Konig | |
| 2012/0328215 A1 | 12/2012 | Thong et al. | |
| 2013/0007870 A1 | 1/2013 | Devarajan et al. | |
| 2013/0055399 A1* | 2/2013 | Zaitsev | H04L 63/0263 726/25 |
| 2013/0060810 A1 | 3/2013 | Maman et al. | |
| 2013/0097708 A1* | 4/2013 | Jayanthi | G06F 21/554 726/25 |
| 2013/0167231 A1* | 6/2013 | Raman | H04L 63/1416 726/23 |
| 2013/0247193 A1 | 9/2013 | Zaitsev | |
| 2014/0032306 A1 | 1/2014 | Sukornyk et al. | |
| 2014/0172495 A1 | 6/2014 | Schneck et al. | |
| 2014/0189873 A1 | 7/2014 | Elder et al. | |
| 2015/0012339 A1 | 1/2015 | Onischuk | |
| 2015/0156213 A1 | 6/2015 | Baker | |
| 2015/0207813 A1* | 7/2015 | Reybok | H04L 63/145 726/22 |
| 2015/0222656 A1* | 8/2015 | Haugsnes | G06F 21/552 726/23 |
| 2016/0094565 A1* | 3/2016 | Adams | G06F 21/577 726/24 |
| 2016/0164890 A1 | 6/2016 | Haugsnes | |
| 2016/0226905 A1* | 8/2016 | Baikalov | H04L 63/1408 |
| 2016/0306965 A1* | 10/2016 | Iyer | G06Q 10/0635 |
| 2017/0048270 A1* | 2/2017 | Boyadjiev | H04L 12/44 |
| 2017/0171231 A1* | 6/2017 | Reybok, Jr. | H04L 63/0428 |
| 2017/0251007 A1* | 8/2017 | Fujisawa | H04L 63/0272 |
| 2017/0289187 A1* | 10/2017 | Noel | G06F 16/9024 |
| 2017/0346768 A1* | 11/2017 | Wise | H04L 51/066 |

OTHER PUBLICATIONS

Sarah Brown et al., From Cyber Security Information Sharing to Threat Management, Oct. 2015, ACM, pp. 43-49. (Year: 2015).*
Mujahid Mohsin et al., Where to Kill the Cyber Kill-Chain: An Ontology-Driven Framework for IoT Security Analytics, Mar. 2, 2017, IEEE, pp. 23-28. (Year: 2017).*
Xiangqian Chen et al., Sensor Network Security: A Survey, Jun. 2, 2009, IEEE, vol. 11, Issue: 2, pp. 52-73. (Year: 2009).*

* cited by examiner

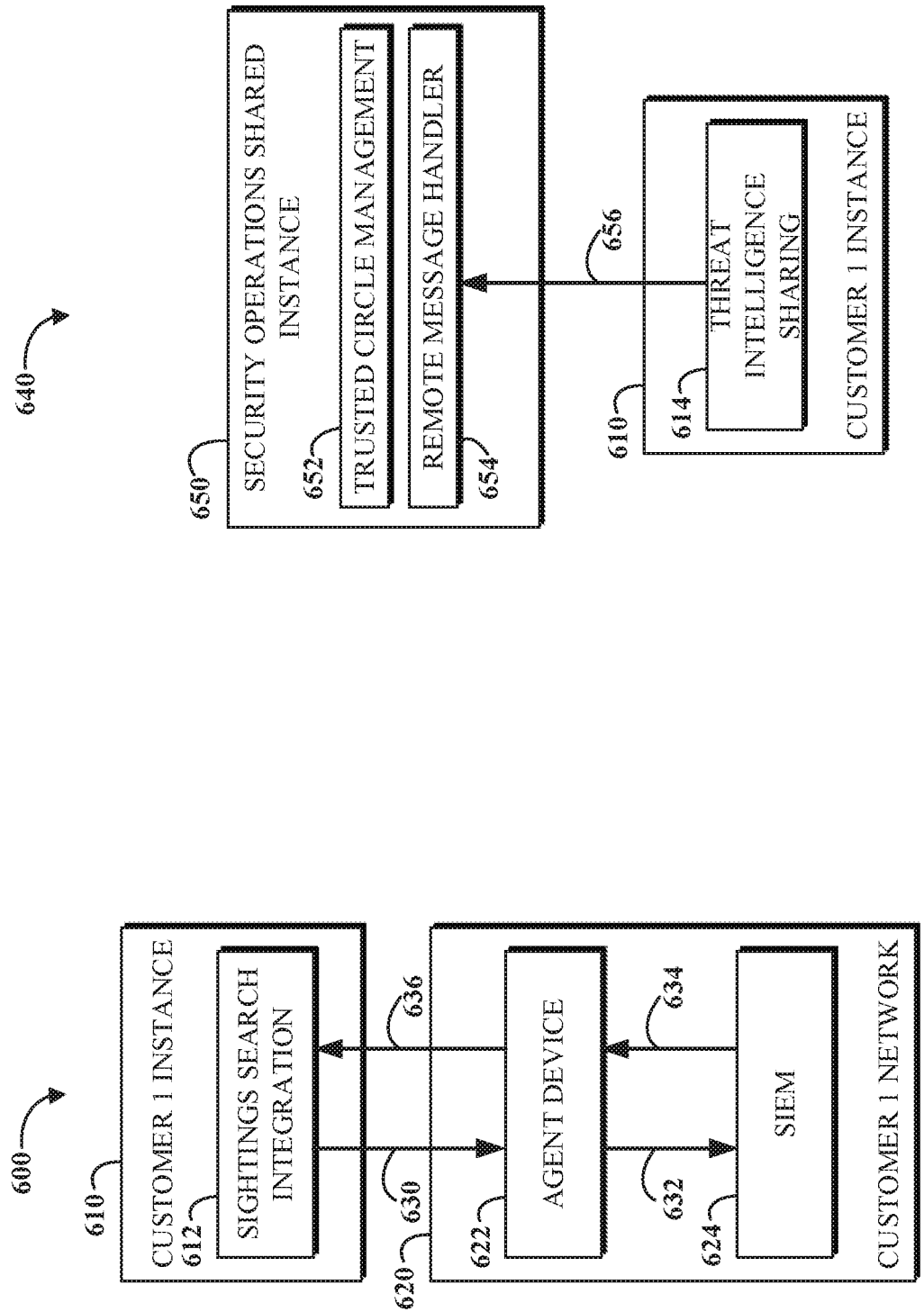

NETWORK SECURITY THREAT INTELLIGENCE SHARING

CROSS-REFERENCE TO RELATED APPLICATIONS

This application is a continuation of and claims priority to U.S. patent application Ser. No. 15/588,152, filed May 5, 2017, which is hereby incorporated by reference in its entirety for all purposes.

BACKGROUND

Computing networks can be large and complex, consisting of many thousands of hardware and software components. Maintaining and operating a large network can present many challenges. One challenge is maintaining the security of a computing network in the presence of fast evolving network security threats (e.g., malware) that are endemic to the Internet. Network security threats that are not addressed can cause down-time for components or otherwise degrade performance of components within a computing network.

SUMMARY

Disclosed herein are implementations of network security threat intelligence sharing.

In an implementation, a system is provided that is operable to obtain network security threat information. The system may include a memory and a processor. The memory includes instructions executable by the processor to cause the system to receive a message from a central instance; based on the message, invoke a search of data associated with a private network, wherein the search is performed by an agent device within the private network and wherein the processor is within a network that is outside of the private network; receive a search result of the search from the agent device; transmit data that is based on the search result to the central instance, wherein the central instance is configured to generate network security threat information based in part on the data that is based on the search result and share the network security threat information with a plurality of customer instances that are associated with a group of customers; and receive an alert message from the central instance, wherein the alert message includes the network security threat information that identifies a network security threat.

In an implementation, a system is provided that is operable to gather information relevant to network security threats. The system may include a plurality of customer instances that are configured to invoke searches of data associated with respective customer networks, wherein the searches are performed by a respective agent device in the respective customer network and wherein the customer instance is outside of the respective customer network. The system may further include a central instance that is configured to: store data reflecting a group of customers that share network security threat information, wherein the plurality of customer instances are respectively associated with a customer from the group of customers; transmit a search query to the customer instances to cause the customer instances to invoke searches of the respective customer networks; receive results of the searches from the customer instances; analyze the results of the searches to generate network security threat information describing a network security threat; and transmit alert messages that include at least some of the network security threat information describing the network security threat to the customer instances.

In an implementation, a method is provided for obtaining network security threat information. The method may include receiving a message from a central instance; from a computing device that is connected to a network that is outside of a private network, invoking a search of data associated with the private network, wherein the search is based on the message and the search is performed by an agent device within the private network; receiving a search result of the search from the agent device; transmitting data that is based on the search result to the central instance, wherein the central instance is configured to generate network security threat information based in part on the data that is based on the search result and share the network security threat information with a plurality of customer instances that are associated with a group of customers; and receiving an alert message from the central instance, wherein the alert message includes the network security threat information that identifies a network security threat.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIGS. 6A-C are block diagrams of example systems configured to perform a sequence of operations to conduct sightings searches of multiple private networks using a shared search query.

DETAILED DESCRIPTION

Figure 1:
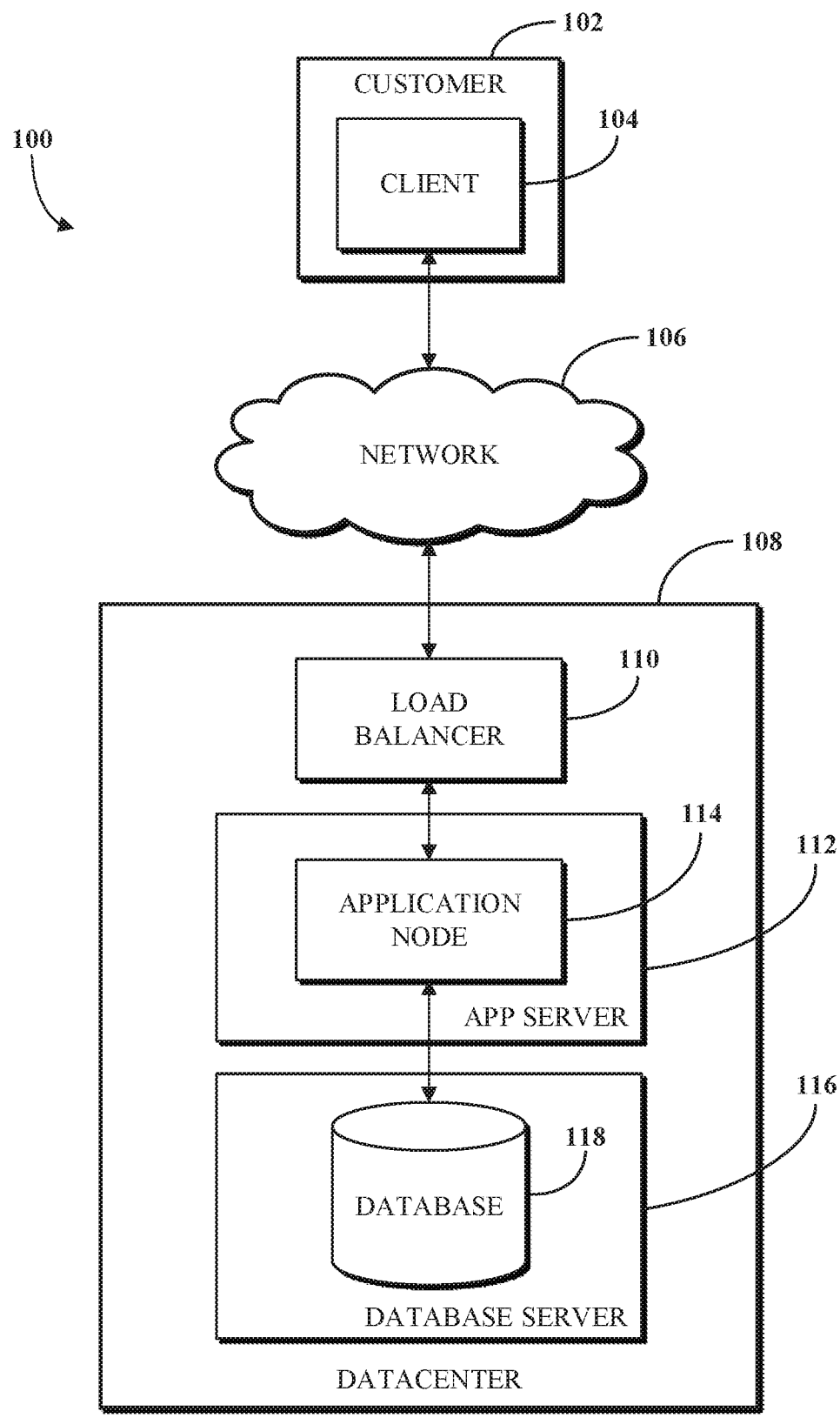
FIG. 1 is a diagram of an example of an electronic computing and communications system.

This document includes disclosure of systems, apparatus, and methods for conducting network security related searches of private networks (e.g., a firewalled or otherwise secured network) that are managed by an external service provider (e.g., a software-as-a-service provider) and sharing information about network security threats among a group of private networks. A network security application that is provided by an external service provider may need to interact a customer's systems, such as SIEM (Security Information & Event Management) systems and Log Stores. These systems are tools, such as those provided by Splunk and Elasticsearch, which contain logs from multiple sources within a customer's environment (e.g., a private network). However data from the log store(s) for a single private network may not be sufficient to track some quickly evolving computing network security threats. Operators of private networks may benefit from sharing information amongst themselves about network security threats. By casting a wider net in their search for current information about evolving network security threats, threats may be recognized and mitigated more quickly, improving network security and thus uptime and other performance metrics for the private networks.

A shared/central instance provided by the external service provider may be used to facilitate this sharing of network security information/intelligence. The central instance may run in a provider's datacenter with a plurality of customer instances operated by the service provider that manage respective private networks from outside of those private networks. The central instance may enable the secure passing of network security information in messages to and from the customer instances via communications within the service provider's secure environment. For example, the central instance may allow members of a group (e.g., a trusted circle) to share data and send search requests anonymously to other members of the group. In some implementations, the central instance may be a source of truth for the groups (e.g., trusted circles) that is responsible for brokering messages between customer instances associated with members of a group.

For example, a member of group may request that other members perform a sightings search for observables of interest within their respective private networks and share the search results via the central instance. For example, the requesting member may form a search query based on one or more observables associated with a network security incident (e.g., generated in response to SIEM alert) in their own private network, and send the search query from their customer instance to the central instance using an anonymous profile. The central instance may verify the authorization of the requesting profile and then forward the search query to multiple customer instances corresponding to members of the group. The customer instances may then perform sightings searches using the search query in the respective private network that they manage. For example, a sightings search may be implemented by a customer instance commanding an agent device in its respective private network to search log stores (e.g., an SIEM) for that private network for data matching the search query. The agent device may return search results (e.g., with sensitive data filtered out) to the customer instance, which may share all or a portion of these results by sending a response message to the central instance. For example, the customer instances may use an anonymous profile to send a response including sightings search results. Expanding a sightings search to multiple private networks in a group may enable users to answer question like whether a network security threat is affecting peers in the group (e.g., entities connected by a supply chain relationship).

The central instance may receive sightings search results from multiple customer instances and analyze these search results to generate network security threat intelligence (e.g., identification of network security threats, their properties, mitigation recommendations, and/or scores or other metadata). The central instance may distribute this network security threat intelligence to members of the group in the form of alert messages from the central instance to customer instances associated with respective members of the group. The customer instances may then utilize the network security threat intelligence to improve security by issuing alerts to users of their respective private networks and/or recommending or implementing network security threat mitigation measures (e.g., a firewall rule, a whitelist, a blacklist, upgrading vulnerable software, uninstalling malware or insecure components, etc.).

Customer instances may register with the central instance in order to use the network security threat intelligence sharing services. This registration may allow the central instance to validate once that this customer has been authorized for the service. For example, the customer instance may register an instance administrator user that is used to create profiles that can be used to share information. Customer instances may be able to create one or more profiles that function as the identity of the customer in any transactions in a group (e.g., a trusted circle). If the profile is identified as anonymous there may be no association between that profile and the customer instance it comes from stored in the central instance. Customers may be able to join one or more public trusted circles by selecting the trusted circle and identifying which profile they want to use to join the trusted circle. Customers may have one anonymous profile created for them automatically. In some implementations, a customer's anonymous profile may be automatically joined to a global trusted circle (e.g., in which all customers of the external service provider are members). For examples, customers may be able to select one or more observables for which there are sightings in their environment and take an action to share those observables, their sightings information, a name and a description to a trusted circle they select. Upon receipt of shared intelligence, a customer instance may perform a local sightings search and respond to the trusted circle with the results. This can be triggered automatically or manually based on a customer's preference. For example, the observables and their sighting information may be sent to an analytics table and stored in a single column as JavaScript Object Notation (JSON) for later use in predictive analytics.

As used in this document, the term "observable" refers to data that represents properties or events related to the operation of networks and network-connected devices. For example, an observable may include a value (e.g., an MD5 hash) and the observable is present in a network device if a value associated with the network device (e.g., a hash of a file on the network device) matches the value (e.g., MD5 hash) of the observable. For example, an observable may be a STIX (Structured Threat Information eXpression) observable. For example, an indicator of compromise (IoC) may be or include one or more observables. An IoC may convey specific observable patterns combined with contextual information intended to represent artifacts and/or behaviors of interest within a cyber security context. An IoC may be a container of one or more observables. Some illustrative examples of observables include an IP address, a domain, a uniform resource locator (URL), a host name, a hash, an MD5, an executable file name, a registry entry, etc. In some implementations, observables (e.g., IoC or STIX observables) may be shared between organizations.

Implementations of this disclosure provide technological improvements particular to computer networks, for example, the provision of network security services to a private network from outside of the private network may be improved. Computer network-specific technological problems, such as adapting to quickly evolving network security threats in the course of providing security services for a private network, can be wholly or partially solved by implementations of this disclosure. For example, searches may be initiated by an external service provider in response to a request from a network security operations shared instance that distributes network security threat data among a group of customers of the external service provider. Implementations of this disclosure can thus introduce new and efficient improvements in the ways in which network security threat related data may be gathered and processed to reduce network security vulnerabilities and mitigate identified network security threats.

To describe some implementations in greater detail, reference is first made to examples of hardware structures. FIG. 1 is a diagram of an example of an electronic computing and communications system 100. As used herein, the term "electronic computing and communications system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit, or as a combination of physical units. In some implementations, a single physical unit can include multiple clients.

The client 104 can be an instance of an application running on a customer device associated with the customer 102. The system 100 can include any number of customers and/or clients and/or can have a configuration of customers and/or clients different from that generally illustrated in FIG. 1. For example, and without limitation, the system 100 can include hundreds or thousands of customers, and at least some of the customers can include and/or be associated with any number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers and/or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated and/or communicate with one or more datacenter networks and/or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, and/or path or using a distinct connection point, link, and/or path. A connection point, link, or path can be wired, wireless, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, and/or any combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the current database 118 of the database server 116.

The application server 112 can include any suitable number of application nodes, depending upon a system load and/or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a current database 118, which can be accessible by an application executed on the application server 112. The current database 118 may be implemented as a relational database management system (RDBMS), an object database, an XML database, a configuration management database (CMDB), a management information base (MIB), one or more flat files, or the like, or a combination thereof. By way of non-limiting example, the system 100, in some implementations, can include an XML database and a CMDB. While limited examples are described, the current database 118 can be configured as and/or comprise any suitable database type. Further, the system 100 can include one, two, three, or any suitable number of databases configured as and/or comprising any suitable database type and/or combination thereof.

In some implementations, the database 118 can be configured as and/or comprise a CMDB. A CMDB can comprise a plurality of configuration items (CIs). A CI can be a CMDB record that represents an infrastructure entity, device, and/or units of the system 100. For example, the customer 102, the client 104, the network 106, the datacenter 108, the load balancer 110, the application server 112, the application node 114, the database server 116, the current database 118, or any other element, portion of an element, or combination of elements of the electronic computing and communications system 100 can be represented in the CMDB by a CI.

The CMDB can include information describing the configuration, the role, or both, of an element of the system 100. In some implementations, an MIB can include one or more databases listing characteristics of the elements of the system 100. In some implementations, an object identifier (OID) can represent object identifiers of objects or elements in the MM.

One or more databases (e.g., the current database 118), tables, other suitable information sources, and/or portions or combinations thereof can be stored, managed, or otherwise provided by one or more of the elements of the system 100 other than the database server 116, such as the client 104 and/or the application server 112.

Some or all of the systems and techniques described herein can operate and/or be executed on or by the servers associated with the system 100. For example, an SIEM or Log Store of the customer 102 can be searched locally for observables in response to a message by a software module executed on the application node 114, and the database 118 may be updated based on results of a search received by the application server 112. In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, and/or both can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the current database 118, and the secondary datacenter can include a secondary database. The secondary database can include an exact or substantially exact mirror, copy, or replication of the primary database. The primary database and/or the secondary database can be implemented as a relational database management system (RDBMS), an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations from being performed directly on the secondary database. In the event that a failover condition associated with the primary database is identified, the secondary database can operate as the primary database and can allow read and/or write access to data. The primary database can then operate as the secondary database, mirror the new primary database, and prevent direct write access to the new secondary database.

A distributed computing system can allocate resources of a computer network using a multi-tenant or single-tenant architecture, for example. Allocation of resources in a multi-tenant architecture can include installations and/or instantiations of one or more servers, such as application servers, database servers, and/or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof can be provisioned for at least some customers and/or customer sub-units. Customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof can be installed on the same physical server. An installation can be allocated a portion of the physical server resources, such as RAM, storage, communications bandwidth, and/or processor cycles.

A customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2:
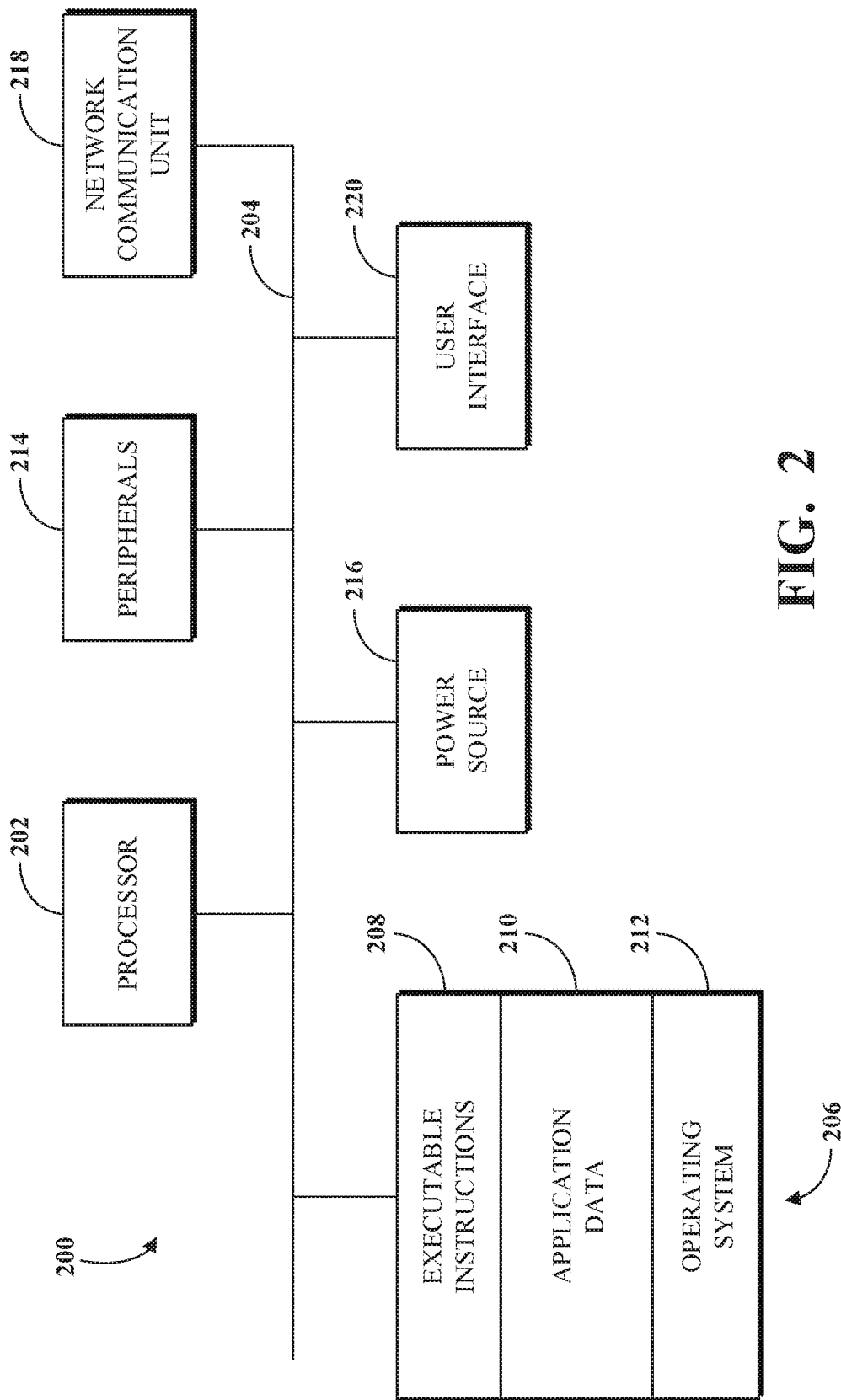
FIG. 2 is a block diagram of an example internal configuration of a computing device of the electronic computing and communications system shown in FIG. 1.

FIG. 2 generally illustrates a block diagram of an example internal configuration of a computing device 200, such as a client 104 and/or a server, such as an application server 112 and/or a database server 116, of the electronic computing and communications system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices. A computing device 200 can include components and/or units, such as a processor 202, a bus 204, a memory 206, peripherals 214, a power source 216, a network communication unit 218, a user interface 220, other suitable components, and/or any combination thereof.

The processor 202 can be a central processing unit (CPU), such as a microprocessor, and can include single or multiple processors, having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired and/or networked, including wirelessly networked. In some implementations, the operations of the processor 202 can be distributed across multiple physical devices and/or units that can be coupled directly or across a local area or other type of network. In some implementations, the processor 202 can include a cache, or cache memory, for local storage of operating data and/or instructions. The operations of the processor 202 can be distributed across multiple machines, which can be coupled directly or across a local area or other type of network.

The memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. The memory 206 can include another type of device, or multiple devices, now existing or hereafter developed, capable of storing data and/or instructions for processing by the processor 202. The processor 202 can access and/or manipulate data in the memory 206 via the bus 204. Although shown as a single block in FIG. 2A, the memory 206 can be implemented as multiple units. For example, a computing device 200 can include volatile memory, such as RAM, and persistent memory, such as a hard drive or other storage. The memory 206 can be distributed across multiple machines, such as network-based memory or memory in multiple machines performing the operations of clients and/or servers.

The memory 206 can include executable instructions 208; data, such as application data 210; an operating system 212; or a combination thereof for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof to perform various functions described herein. For example, the executable instructions 208 can include instructions to receive a message from a central instance; invoke a search, based on the message, of data associated with a private network, wherein the search is performed by an agent device within the private network and the search is invoked from outside of the private network; receive a search result of the search from the agent device; transmit data based on the search result to the central instance, wherein the central instance is configured to generate network security threat information based in part on the data based on the search result and share the network security threat information with multiple customer instances that are associated with a group of customers; and receive an alert message from the central instance, wherein the alert message includes the network security threat information that identifies a network security threat.

The application data 210 can include, for example, user files; database catalogs and/or dictionaries; configuration information for functional programs, such as a web browser, a web server, a database server; and/or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself and/or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, a client and/or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204. Although depicted here as a single bus, the bus 204 can be composed of multiple buses, which can be connected to one another through various bridges, controllers, and/or adapters.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; and/or any other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
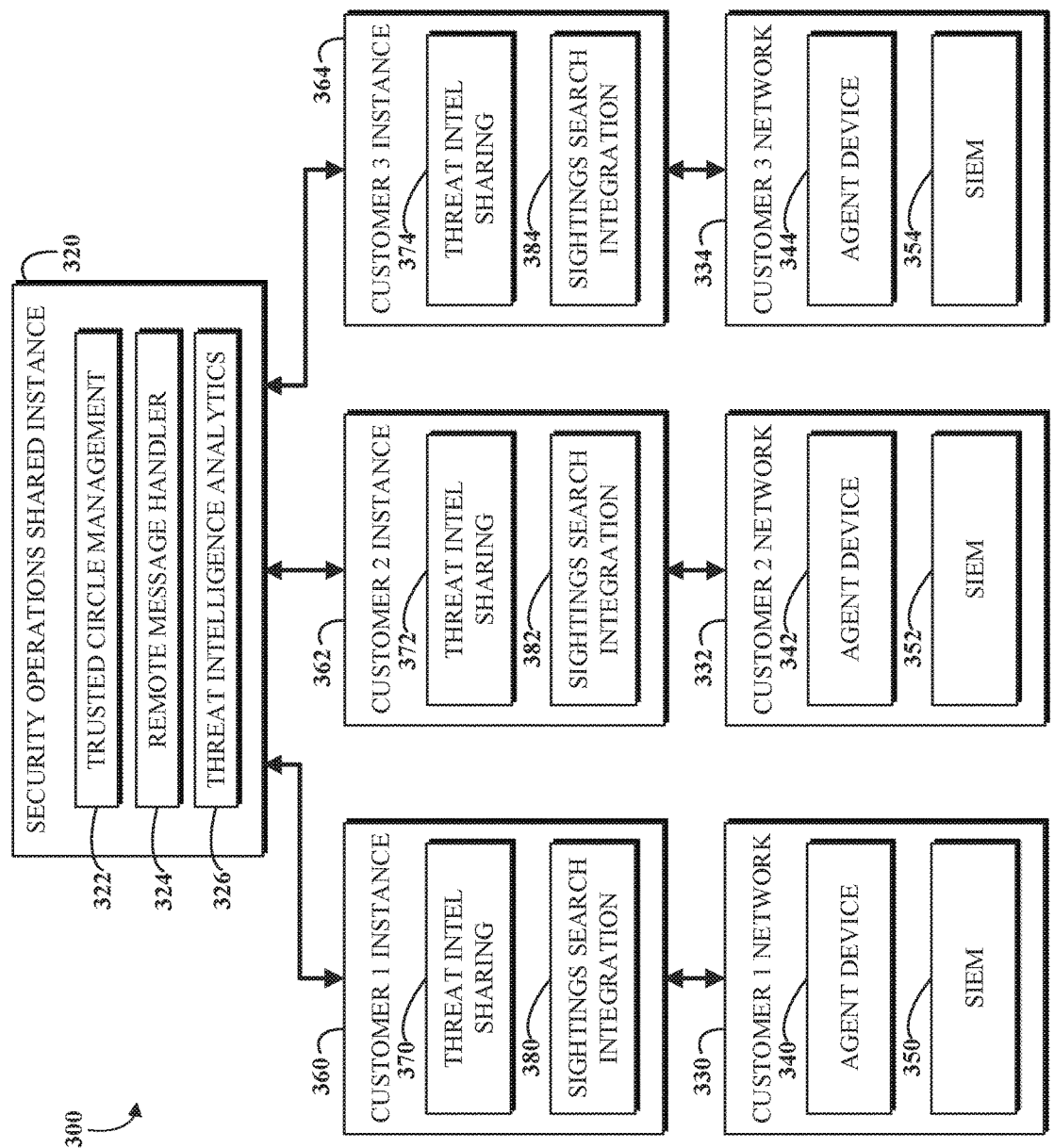
FIG. 3 is a block diagram of an implementation of a system usable for sharing network security threat data among a group of customer networks.

FIG. 3 is a block diagram of an implementation of a system 300 usable for sharing network security threat data among a group of customer networks. The system 300 can, for example, be implemented using some or all of electronic computing and communications system 100. For example, security operations shared instance 320 and/or customer instances 360, 362, and 364 can be implemented using platform software executing on one or more application nodes 114 and data stored on one or more databases 118. For example, the platform software may be used to implement trusted circle management module 322, remote message handler module 324, threat intelligence analytics module 326, threat intelligence sharing module 370, and sightings search activity module 380. For example, one or more of these modules (e.g., 322, 324, 326, 370, and/or 380) may be implemented as a plugin. For example, customer 1 network 330 may be part of customer 102.

The system 300 includes a security operations shared instance 320. For example, security operations shared instance 320 may be a multitenant instance that serves a plurality of customers and their associated private networks (e.g., customer 1 network 330, customer 2 network 332, and customer 3 network 334). These private networks may be managed by respective customer instances (e.g., customer 1 instance 360, customer 2 instance 362, and customer 3 instance 364) that provide network security services. Security operations shared instance 320 may be operated by a computing network security service provider (e.g., using datacenter 108). Security operations shared instance 320 is not necessarily customer specific. Security operations shared instance 320 may have components that manage the behavior of groups of customer networks that may share network security threat intelligence data while protecting the identities of the participants in the group (e.g., by anonymizing data messages sent to and/or from security operations shared instance 320. Security operations shared instance 320 may also be responsible for collecting threat intelligence analytics to be used for predictive intelligence. For example, components of a deployment of the platform may be developed as a scoped application. Sharing group management, group member profile management, and message handler may be exposed via scripted REST APIs (Representational State Transfer Application Programming Interfaces). In some implementations, a customer does not access security operations shared instance 320 directly. Customer instances (e.g., customer 1 instance 360, customer 2 instance 362, and customer 3 instance 364) may serve as an interface between the security operations shared instance 320 and their respective customer networks (e.g., customer 1 network 330, customer 2 network 332, and customer 3 network 334). Security operations shared instance 320 may be accessed by the threat intel sharing module (e.g., 370, 372, or 374), which may be implemented as a client plugin via REST APIs. For example, security operations shared instance 320 may implement the technique 500 of FIG. 5.

Security operations shared instance 320 includes a trusted circle management module 322 that is responsible for managing groups of private networks—called trusted circles. A data model for the trusted circle management module 322 may include member profiles (users), trusted circles (groups), and trusted circle members (group membership). Trusted circle management module 322 may be responsible for providing this data via REST APIs available to a customer instance (e.g., customer 1 instance 360, customer 2 instance 362, and customer 3 instance 364). The API of the trusted circle management module 322 may enable registering a customer instance. Before a customer instance uses the features of security operations shared instance 320, that customer instance registers with security operations shared instance 320. A request can be validated by a call to a usage, analytics, or licensing software API to verify that a customer instance making the request is authorized for a requested feature. The API of the trusted circle management module 322 may enable registering a member profile, including transmission of the public key from a customer instance (e.g., customer instance 360) to security operations shared instance 320. The API of the trusted circle management module 322 may enable updating and deleting a member profile (e.g., in a database of group members). The API of the trusted circle management module 322 may enable creating a new group of customers associated with private networks (e.g., a trusted circle). The API of the trusted circle management module 322 may enable accessing and/or editing a list of groups (e.g., trusted circles). The API of the trusted circle management module 322 may enable generating an invitation to join a group (e.g., a trusted circle) that may be sent to a customer instance (e.g., customer 1 instance 360). The API of the trusted circle management module 322 may enable listing outstanding invitations. The API of the trusted circle management module 322 may enable accepting an invitation to join a group via a message sent from a customer instance (e.g., customer 1 instance 360). Security operations shared instance 320 may authenticate any requests to ensure that only valid customer instances can access the APIs of security operations shared instance 320.

Security operations shared instance 320 includes a remote message handler module 324 that may be responsible for receiving threat intelligence sharing requests and sending corresponding messages to participants or members of a group (e.g., a trusted circle) of customers associated with private networks. In some implementations, remote message handler module 324 may be responsible for creating response messages for all participants or members. A pull model may be leveraged, where specific customer instances (e.g., customer 1 instance 360, customer 2 instance 362, and customer 3 instance 364) check with the security operations shared instance 320 (e.g., periodically every 30 seconds) for any incoming messages. For example, messages may be encrypted using a profile's public key prior to being put in the message queue so that it could only be decrypted by the recipient's customer instance. In some implementations, the messages may be sent with asymmetric encryption. In some implementations, the messages are unencrypted but may still be protected by authentication, authorization in the APIs, as well is in transit through the HTTPS protocol. For example, to limit message storage growth, messages may be removed as soon as they are picked up by the target customer instance, or dropped after an expiration period (e.g., 48 hours) of no-pickup. Message expiration may be controlled by a configurable property.

Security operations shared instance 320 includes a threat intelligence analytics module 326 that generates network security threat information (e.g., based on information provided by customer instances on behalf group members that share network security threat data). For example, the network security threat information from threat intelligence analytics module 326 may include identification of a network security threat and a score (e.g., a risk assessment score) associated with the network security threat. In some implementations, threat intelligence analytics module 326 may provide a score for an observable or security incident. For example, threat intelligence analytics module 326 may provide a method to determine whether indicators of compromise are internal and/or external to a customer's private network and with what frequency. In some implementations, an API of threat intelligence analytics module 326 may accept an entity and a set of score factors and reply with a set of score factors. A customer instance (e.g., customer 1 instance 360) may then combine these factors to create a summarized score. For example, threat intelligence analytics module 326 may collect scoring factors and provide a framework for providing additional scoring factors to facilitate development of new centralized scoring capabilities.

The example system 300 includes customer instances (customer 1 instance 360, customer 2 instance 362, and customer 3 instance 364) serving respective customer networks (customer 1 network 330, customer 2 network 332, and customer 3 network 334). The customer instances provide network security services to their respective customer networks. The customer instances include respective threat intelligence sharing modules (370, 372, and 374) that manage the interface with the security operations shared instance 320 for their customer and the associated customer network. The customer instances include respective sightings search integration modules (380, 382, and 384) that manage searches of data associated with their respective customer networks for information (e.g., occurrences of observables) related network security threats. The customer networks (330, 332, and 334) include respective agent devices (340, 342, 344) that may conduct searches of network data and/or other operations from within the respective customer networks. The customer networks (330, 332, and 334) include respective SIEMs (350, 352, 354) that may store network security data for the respective customer networks. For example, sightings search integration module 380 may communicate with agent device 340 to invoke a search conducted within customer 1 network 330 of data associated with customer 1 network 330, including data stored in STEM 350. Agent device 340 may return search results (e.g., indicating occurrences of observables) to sightings search integration module 380 in customer 1 instance 360. The threat intelligence sharing module 370 may in turn pass information based on a search result (e.g., the entire search result, a subset of the data in the search result, and/or a summary of data in the search result) to the security operations shared instance 320 for potential sharing with other customer networks in a group (e.g., a trusted circle). For example, customer instances (360, 362, and 364) may implement the technique 400 of FIG. 4.

The customer instances (360, 362, and 364) include respective threat intelligence sharing modules (370, 372, and 374). In some implementations, installing a threat intel sharing plugin within a customer instance may be a perquisite to participate in a trusted circle. Threat intelligence sharing modules (370, 372, and 374) may be responsible for displaying trusted circle membership within the service platform and for keeping the membership information up-to-date. Threat intelligence sharing modules (370, 372, and 374) may also be responsible for initiating messages to security operations shared instance 320 and receiving messages from security operations shared instance 320. Messages may be received by accessing a REST API at a regular interval (e.g., every 30 seconds, every minute, or every hour. Threat intelligence sharing modules (370, 372, and 374) may also be responsible for configuring and applying policies. Threat intelligence sharing modules (370, 372, and 374) may run on a respective customer instance (360, 362, and 364) and may be installed as an independent scoped application.

For example, threat intelligence sharing modules (370, 372, and 374) may share data including observables (e.g., IP addresses, hashes, domains, and uniform resource locators), the sightings of those observables, a name of the shared information, and a plain text description of the shared information. For example, the sightings of observables may be formed as a number of sightings as well as the sightings over time bucketed by hour. Specific occurrences bucketed by hour can be a very verbose record. In some implementations, specific occurrences bucketed by hour is represented as a JavavScript Object Notation (JSON)Array and persisted in a compressed column, which may prevents us from having to insert large numbers of records in a table (e.g., 720 records for a single indicator during a 30-day window). With observable occurrence data in the JSON Array format we can still use it for future analytics and graphing.

The customer instances (360, 362, and 364) include respective sightings search integration modules (380, 382, and 384), which may be implemented as plugins. In some implementations, several components such as Splunk and QRadar are included as separate plugins and the threat intelligence sharing modules (370, 372, and 374) may be configured to access a variety of network security plugins in a consistent fashion. When a customer instance (e.g., customer 1 instance 360) participates in a shared request the customer instance will access its respective threat intelligence sharing module (e.g., threat intelligence sharing module 370) and a specific integration plugin such as Splunk or Elasticsearch to initiate a search against a log source and get the response back in a consistent data model. The results of these searches may be stored locally and used to create a remote response to a trusted circle query.

Security is an important aspect of the system 300. Security operations shared instance 320 may be specifically designed so that it protects data by enforcing anonymity and minimizing the amount of sensitive information stored. When a customer instance (e.g., customer 1 instance 360) is registered with security operations shared instance 320, a user record may be created on security operations shared instance 320 to support authentication and role-based security management of actions initiated through REST APIs. When additional profiles are created on the customer instance e.g., customer 1 instance 360), corresponding users may be created on security operations shared instance 320 to support authentication and security management of these new profiles. In some implementations, created users may be marked as 'Web service access only'. For example, profiles may have a one-to-one mapping to users on security operations shared instance 320. Users may be assigned random, cryptographically strong passwords created on their customer instance. As the profiles are registered with security operations shared instance 320, the associated user is assigned the appropriate security role to allow Access Control List (ACL) control of access to records on security operations shared instance 320. For example, an Instance-Administrator profile (created when an admin on a customer instance registers with security operations shared instance 320) is associated with a role allowing it to create new profiles and disable existing profiles associated with the customer instance. In some implementations, a limit is enforced on the number of profiles a customer instance is allowed to create in order to avoid flooding of security operations shared instance 320. For example, an administrator on security operations shared instance 320 can perform profile maintenance using Hop functionality.

When a group or trusted circle is created by the trusted circle management module 322, the creating profile (user) becomes the initial administrator for the group. In some implementations, groups are immutable once created and only related records, such as group membership and membership invitations, can be modified. Public groups or trusted circles are discoverable via API. Private groups or trusted circles can only be joined by invitation from an existing member. Groups or trusted circles can be marked as requiring admin approval, so a membership invitation must be approved by a circle admin before membership is granted. A Circle admin may be able to add other admins and control circle membership. For example, an administrator on security operations shared instance 320 can perform maintenance on circles as needed using Hop functionality.

For example messages may sent by remote message handler module 324 and retrieved by customer instances (360, 362, and 364) via REST APIs. A message has a source and a target and may be stored in a message table on security operations shared instance 320. A customer instances (e.g., 360, 362, or 364) can retrieve messages targeted at a profile associated with the customer instance, causing those messages to be removed from the message table. Retrieval may be controlled by a scheduled job running on the customer instance (e.g., 360, 362, or 364). For example, messages sent to trusted circles maybe copied into multiple messages, targeted at the circle members existing at the time of message sending. Messages not picked up within the specified time limit (e.g., 48 hours) may be removed from the message table. Additionally, messages may use a compressed data type to reduce storage size.

For example, customer instances (360, 362, and 364) with a threat intelligence sharing module (370, 372, and 374) installed may send a request for messages (e.g., every 30 seconds) for each profile created. The request may be a stateless RESTful GET request to security operations shared instance 320. This request will return an empty response unless a message has been sent to the user/profile. On security operations shared instance 320, getting any messages for a profile may be a single query in addition to REST authentication. Since this table is cleaned regularly, this should not be an computing resource intensive query. These messages may be stored in compressed data fields.

Some information may be persisted in security operations shared instance 320 when a customer shares threat intelligence. For example, persisted information may be used for centralized threat scoring. In some implementations, persisted network security threat information is stored in a separate table and not exposed via API.

Access to the security operations shared instance 320 may be restricted to internal access via Hop from computing devices within the same computing network or datacenter (e.g., datacenter 108). API access may also be limited to the customer instances (360, 362, and 364) via firewall controls. In some implementations, exceptions to these firewall controls may be made for customers with on-site installs that also want threat intelligence sharing capabilities. In some implementations, REST APIs on security operations shared instance 320 are not be exposed to the public internet.

The modules of system 300 may be implemented directly in hardware, firmware, software executed by hardware, circuitry, or a combination thereof. For example, modules may be implemented using a machine-readable program or other computer-executable instructions, such as instructions or programs described according to JavaScript, C, or other such instructions.

Alternative implementations of system 300 are possible. For example, aspects of system 300 may be implemented using additional, less, or differently configured modules, devices, or components than those shown. For example, system 300 may omit or not use some or all of the agent devices (340, 342, and 344) and searches of data for a customer network may be performed directly by a respective customer instance. For example, system 300 may omit or not use some or all of the SIEMs (350, 352, 354) and data of a customer network may be accessed from other sources within the customer network (e.g., by invoking discovery probes against many computing devices in the customer network). For example, the functionality described with respect to trusted circle management module 322, remote messaging module 324, and threat intelligence analytics module 326 may be implemented in a fewer or greater number of modules and may, for example, be implemented in a single software program. For example, data for security operations shared instance 320 and/or the customer instances (360, 362, and 364) may be stored on separate database servers (e.g., the database server 116).

Figure 4:
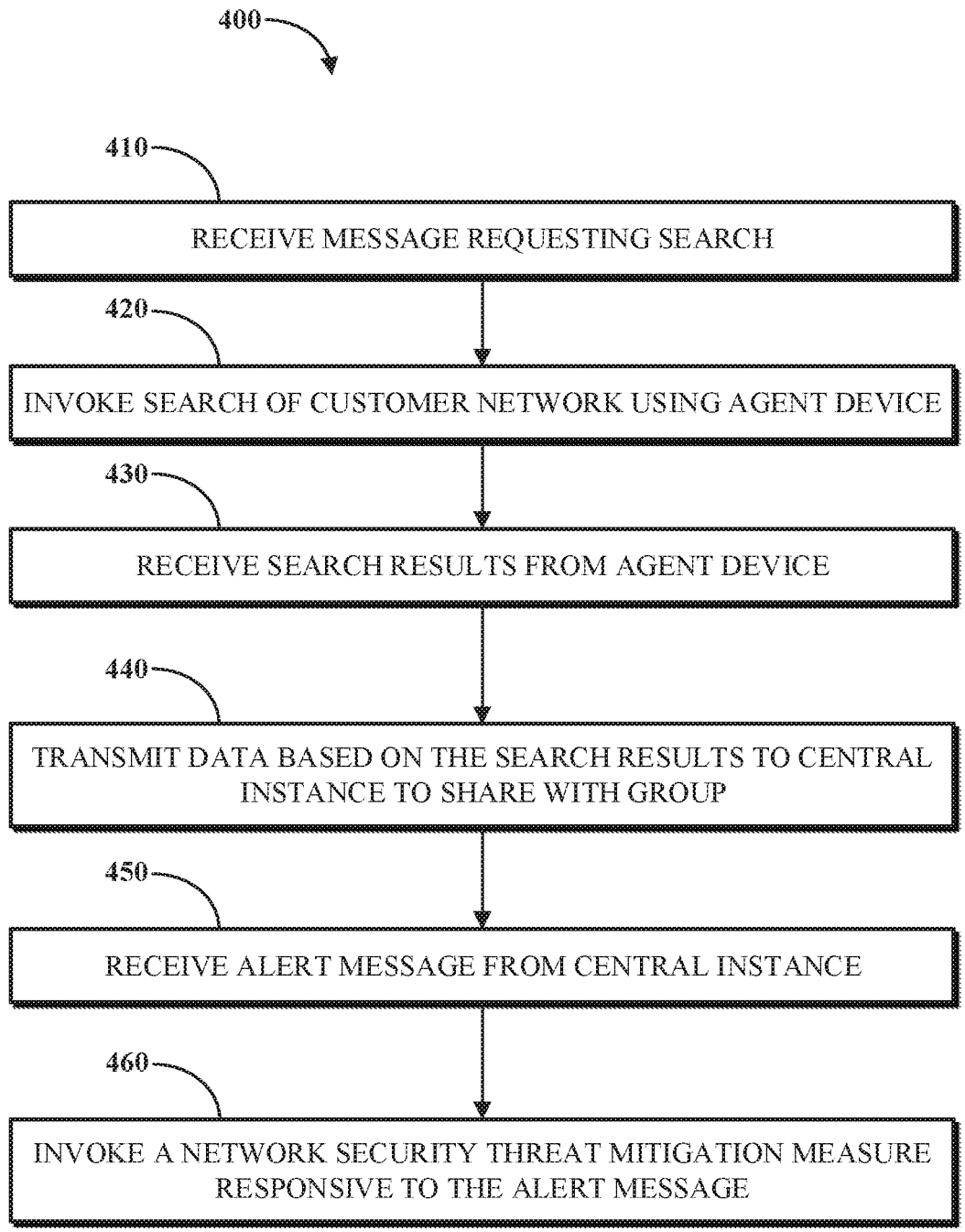
FIG. 4 is a logic flowchart illustrating an example of a technique for conducting a sightings search of a private network in response to a request to gather information for sharing with a group of customer networks.

FIG. 4 is a flowchart illustrating an example of a technique 400 for conducting a sightings search of a private network in response to a request to gather information for sharing with a group of customer networks in an electronic computing and communications system, such as the system 100 as generally illustrated in FIG. 1. In some implementations, the technique 400 can be executed using computing devices, such as the systems, modules, and devices described with respect to FIGS. 1, 2, and 3. In some implementations, the technique 400 can be performed, for example, by executing a machine-readable program or other computer-executable instructions, such as instructions or programs described according to JavaScript, C, or other such instructions. The steps, or operations, of the technique 400 or any other technique, method, process, or algorithm described in connection with the implementations disclosed herein can be implemented directly in hardware, firmware, software executed by hardware, circuitry, or a combination thereof.

The example technique 400 includes receiving 410 a message from a central instance; invoking 420 a search of data for a customer network using an agent device operating within the customer network; receiving 430 search results from the agent device; transmitting 440 data based on the search results to the central instance to share with a group of private networks; receiving 450 an alert message from the central instance; and, responsive to the alert message, invoking 460 a network security threat mitigation measure in the customer network. For example, the technique 400 may be implemented by a customer instance (e.g., customer 1 instance 360, customer 2 instance 362, and customer 3 instance 364). In some implementations, the technique 400 may enable gathering information relevant to network security threats an enhance network security for the private networks.

The example technique 400 includes receiving 410 a message from a central instance (e.g., security operations shared instance 320). The message may request a search of data for a customer network (e.g., the customer 1 network 330). For example, the message may include a search query. For example, the message may include a search query from a member of a group of customers that is relayed by the central instance. For example, the message may include one or more observables (e.g., an IP address, a domain, a host name, a hash, an executable file name, a registry entry, etc.). For example, the message may include a shared search query 690 received 410 as described in relation to the example scenario of FIGS. 6A-C. For example, the message may be received 410 by the customer 1 instance 360 of FIG. 3 via a network interface (e.g., the network communication unit 218).

The example technique 400 includes invoking 420 a search of data associated with a private network (e.g., customer 1 network 330). The search may be invoked 420 from a computing device (e.g., the application server 112 running the customer 1 instance 360) that is connected to a network (e.g., a network in the datacenter 108) that is outside of the private network. The search may be based on the message received 410 from the central instance (e.g., security operations shared instance 320) and the search may be performed by an agent device (e.g., agent device 340) within the private network. For example, the search performed by the agent device may include querying a security information and event management database (e.g., SIEM 350) of the private network. For example, invoking 420 the search may cause a search result to be obtained that reflects occurrences in the private network of one or more observables from the message. For example, the message may include a search query and the search may be invoked with the search query. In some implementations, invoking 420 a search may include invoking a search of a log store or similar database (e.g., SIEM 350) within the private network. For example, the log store may be a Splunk log store or an Elasticsearch log store for the private network. In some implementations, invoking 420 a search may include invoking a discovery probe against a target device operating in the private network. In some implementations, invoking 420 a search may include invoking multiple searches, including follow up searches based on an initial search result. For example, a JavaScript probe may be executed by the agent device 340 to invoke 420 a search of data associated with the private network to obtain a search result. For example, if the message includes an observable that includes a MD5 hash of a file, the search may include generating hashes of files on a network device to determine whether the MD5 hash of the observable matches a hash of a file of the network device. For example, the search result may include records returned from a log store for the private network, where the returned records have one or more fields matching the observable. For example, the search result may include discovery probe data that is found to include an occurrence of the observable. In some implementations, the search result may include records or other data received from a plurality of sources (e.g., computing devices) within the private network.

The example technique 400 includes receiving 430 a search result of the search from the agent device (e.g., agent device 340). For example, the search result may include an indication of an observable, a count of occurrences of the observable, and identification of one or more components of the customer network associated with the observable. The indication of the observable may directly or indirectly identify the observable. For example, the indication of the observable may be a copy of the observable or an identifier associated with the observable. For example, the count of occurrences of the observable may be a total count of all occurrences of the observable found in searches of data of the private network. In some implementations, the count of occurrences of the observable may be one of multiple counts of the observable. For example, occurrences of an observable may be associated with respective times (e.g., having timestamps) and counts of the observable occurring within respective time intervals of an analysis period may be determined and include in the report. These counts, including the count, may comprise a histogram. For example, the one or more components may be software components and/or hardware components in the private network. For example, the one or more components may be represented by configuration items in a configuration management database. For example, the identification of one or more components associated with the observable may include one or more host names of devices in the private network. The report may omit sensitive data that is not needed by a system implementing the technique 400 to facilitate sightings searches and associated network security functions. In this manner, network security risks caused by exposing sensitive data outside of the private network may be avoided. For example, search results may be received 430 by a customer instance (e.g., 360, 362, or 364) running on an application server (e.g., the application server 112) operating in the provider datacenter 108, outside of the private network (e.g., customer 1 network 330, customer 2 network 332, or customer 3 network 334) associated with the customer instance. For example, the search results may be received 430 using a network interface (e.g., the network communication unit 218).

The example technique 400 includes transmitting 440 data that is based on the search result to the central instance (e.g., security operations shared instance 320). The central instance may be configured to generate network security threat information based in part on the data that is based on the search result and share the network security threat information with a plurality of customer instances that are associated with a group of customers. For example, data that is based on the search result may be transmitted 440 by a customer instance (e.g., 360, 362, or 364) running on an application server (e.g., the application server 112) operating in the provider datacenter 108, outside of the private network (e.g., customer 1 network 330, customer 2 network 332, or customer 3 network 334) associated with the customer instance. For example, the data that is based on the search results may be transmitted 440 using a network interface (e.g., the network communication unit 218).

The example technique 400 includes receiving 450 an alert message from the central instance (e.g., security operations shared instance 320). The alert message may include network security threat information that identifies a network security threat (e.g., malware or a malicious external host). The alert message may have been generated by the central instance based on information collected from one or more members of a group (e.g., a trusted circle) of customer networks. For example, the alert message may be generated by the central instance using the technique 500 of FIG. 5. For example, the alert message may be received 450 by a customer instance (e.g., 360, 362, or 364) running on an application server (e.g., the application server 112) operating in the provider datacenter 108, outside of the private network (e.g., customer 1 network 330, customer 2 network 332, or customer 3 network 334) associated with the customer instance. In some implementations, data from the alert message may be presented to a user (e.g., a system administrator of a customer network) in the display region 710 of FIG. 7. For example, the alert message may be received 450 using a network interface (e.g., the network communication unit 218).

The example technique 400 includes, responsive to the alert message, invoking 460 a threat mitigation measure using a framework configured to interface to a plurality of network security products provided by different software publishers. For example, the framework may accept descriptions of network security threat mitigation measures (e.g., whitelists, blacklists, and firewall rules) in a common format and translate them to API commands that may be input to an applicable one of the plurality of network security products provided by different software publishers in order to utilize that network security product to implement the threat mitigation measure. For example, invoking 460 a threat mitigation measure may include causing a firewall rule for the private network to be updated to block communications from a malicious external host. For example, invoking 460 a threat mitigation measure may include causing malware installed on a computing device in the private network to be uninstalled. For example, invoking 460 a threat mitigation measure may include causing a software whitelist or blacklist to updated to prevent the installation of malware. Invoking 460 a threat mitigation measure in a customer network (e.g., the customer 1 network 330 may enhance network security and thus improve network up-time or other performance metrics for the customer network.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. For example, the technique 400 may be augmented to include determining a risk score for an observable based on occurrences of the observable reflected in the search result. The risk score may reflect an estimate of the impact of a network security incident associated with the observable on the private network. For example, the score may be determined as a linear combination of counts of occurrences in the private network for observables associated with the network security incident. In some implementations, a score for a network security incident associated with the observable is determined based on the identification of the one or more hosts in the private network that have been identified based on the search result. For example, example the score may be determined based on a count of the number of hosts in the private network that have been identified as associated with (e.g., impacted by) the network security incident. In some implementations, the score may depend on weights for respective hosts or other types of computing resources in the private network represented by configuration items that reflect the relative importance of those computing resources to the operations of the private network. For example, determining the risk score may include inputting data pertaining to occurrences of the observable to a machine learning module (e.g., a neural network or a support vector machine) and determining the risk score based on a resulting output of the machine learning module. Furthermore, one or more aspects of the systems and techniques described herein can be omitted. For example, receiving 450 the alert message and/or invoking 460 the network security threat mitigation measure are operations that may be omitted. In some implementations, responsive to the alert message, a recommendation to implement a network security mitigation measure may be presented to a user (e.g., a system administrator) of the private network.

Figure 5:
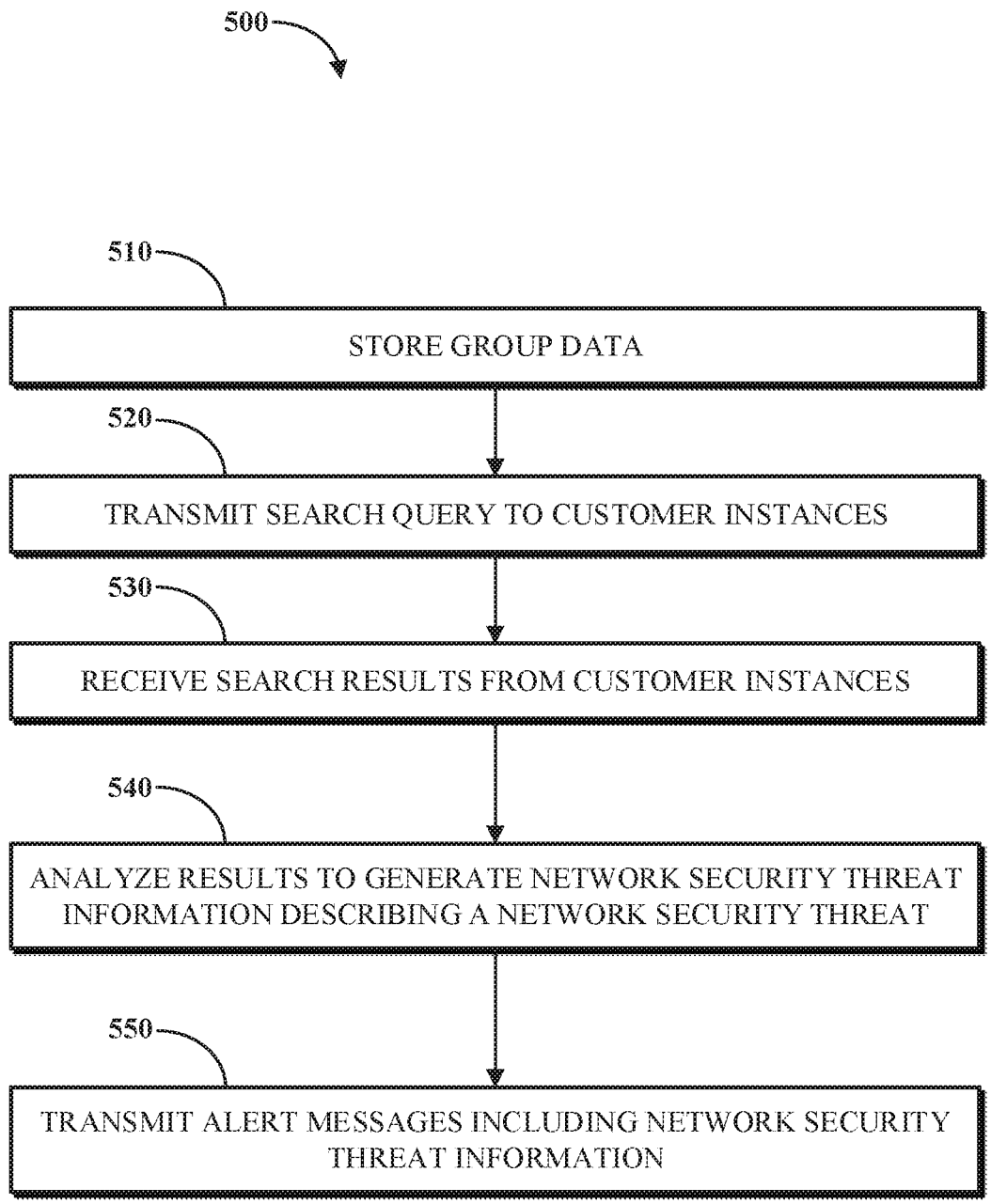
FIG. 5 is a logic flowchart illustrating an example of a technique for collecting, analyzing, and distributing information about network security threats for a group of private networks.

FIG. 5 is a flowchart illustrating an example of a technique 500 for collecting, analyzing, and distributing information about network security threats for a group of private networks in an electronic computing and communications system, such as the system 100 as generally illustrated in FIG. 1. In some implementations, the technique 500 can be executed using computing devices, such as the systems, modules, and devices described with respect to FIGS. 1, 2, and 3. In some implementations, the technique 500 can be performed, for example, by executing a machine-readable program or other computer-executable instructions, such as instructions or programs described according to JavaScript, C, or other such instructions. The steps, or operations, of the technique 500 or any other technique, method, process, or algorithm described in connection with the implementations disclosed herein can be implemented directly in hardware, firmware, software executed by hardware, circuitry, or a combination thereof.

The example technique 500 includes storing 510 group data; transmitting 520 a search query to customer instances associated with members of a group; receiving 530 search results from the customer instances; analyzing 540 the search results to generate network security threat information describing a network security threat; and transmitting 550 one or more alert messages including network security threat information to members of the group. For example, the technique 500 may be implemented by a central instance (e.g., security operations shared instance 320). In some implementations, the technique 500 may enable sharing of network security threat information among a group of private networks to facilitate improvement of network security for the private networks.

The example technique 500 includes storing 510 data reflecting a group of customers that share network security threat information. A plurality of customer instances (e.g., customer 1 instance 360, customer 2 instance 362, and customer 3 instance 364) may be respectively associated with a customer from the group of customers. The plurality of customer instances may be configured to invoke searches of data associated with respective customer networks (e.g., customer 1 network 330, customer 2 network 332, and customer 3 network 334), wherein the searches are performed by a respective agent device (e.g., 340, 342, or 344) in the respective customer network. The customer instances may be outside of their respective customer network. For example, the data reflecting a group (e.g., a trusted circle) may be stored 510 in a manner described in relation to trusted circle management module 322 of FIG. 3. For example, the data reflecting a group (e.g., a trusted circle) may be stored 510 in a database (e.g., the database 118).

The example technique 500 includes transmitting 520 a search query to the customer instances (e.g., customer 1 instance 360, customer 2 instance 362, and customer 3 instance 364) to cause the customer instances to invoke searches of the respective customer networks (e.g., customer 1 network 330, customer 2 network 332, and customer 3 network 334). For example, the search query may have been relayed from a member of a group of customers that is relayed by the central instance. For example, the search query may include one or more observables (e.g., an IP address, a domain, a host name, a URL, a hash, an MD5, an executable file name, a registry entry, etc.). In some implementations, multiple observables may be included in a message. For example, the search query may be transmitted 520 by a central instance (e.g., security operations shared instance 320) to customer instances (e.g., 360, 362, and 364) running on one or more application servers (e.g., the application server 112) operating in the provider datacenter 108, outside of the private network(s) (e.g., customer 1 network 330, customer 2 network 332, and customer 3 network 334) associated with the customer instances. For example, the search query may be transmitted 520 using a network interface (e.g., the network communication unit 218).

The example technique 500 includes receiving 530 results of the searches from the customer instances (e.g., customer 1 instance 360, customer 2 instance 362, and customer 3 instance 364). For example, search results may include an indication of an observable, a count of occurrences of the observable, and identification of one or more components of the customer network associated with the observable. The indication of the observable may directly or indirectly identify the observable. For example, the indication of the observable may be a copy of the observable or an identifier associated with the observable. For example, the count of occurrences of the observable may be a total count of all occurrences of the observable found in searches of data of the private network. In some implementations, the count of occurrences of the observable may be one of multiple counts of the observable. For example, occurrences of an observable may be associated with respective times (e.g., having timestamps) and counts of the observable occurring within respective time intervals of an analysis period may be determined and include in the report. These counts, including the count, may comprise a histogram. In some implementations, the results of the searches include one or more observables and sightings information for the one or more observables. For example, the sightings information may include counts of occurrences of the one or more observables bucketed by time intervals. For example, search results may be received 530 by a central instance (e.g., security operations shared instance 320) from customer instances (e.g., 360, 362, and 364) running on one or more application servers (e.g., the application server 112) operating in the provider datacenter 108, outside of the private network(s) (e.g., customer 1 network 330, customer 2 network 332, and customer 3 network 334) associated with the customer instances. For example, the search results may be received 530 using a network interface (e.g., the network communication unit 218).

The example technique 500 includes analyzing 540 the results of the searches to generate network security threat information describing a network security threat. For example, a central instance (e.g., security operations shared instance 320) may be configured to analyze the results of the searches using a machine learning module (e.g., a neural network or a support vector machine) to determine a score for the network security threat.

In some implementations, a central instance (e.g., security operations shared instance 320) may be configured to analyze the results of the searches using a machine learning module (e.g., a neural network or a support vector machine) to identify a kill chain of related network security vulnerabilities in one of the respective customer networks of one of the plurality of customer instances. For example, the central instance may be configured to select a remediation measure based on the identified kill chain and transmit a recommendation to perform the selected remediation measure to the one of the plurality of customer instances.

Complex problems can arise in computing network security that involve interactivity between heterogeneous infrastructures/applications and heterogeneous attack/malware patterns. For example, a specific combination of malware exploits with specific a system configuration that includes a combination of network security vulnerabilities may lead to a kill—or compromise of network security. The network security vulnerabilities in a kill chain may interact in the sense that a malicious actor or device may use a sequence or other combination of exploits associated respectively with these network security vulnerabilities to compromise the security of a private network. It may be the case that all of the vulnerabilities in a kill chain are needed by the malicious actor to compromise the security of the private network, so that mitigating one of the network security vulnerabilities in the kill chain may be sufficient to prevent compromise of the security of the private network. Since the implementation of threat mitigation measures (e.g., upgrading software or uninstalling vulnerable software) can impose performance costs (e.g., system downtime during an upgrade) it may be useful to implement a critical subset of available network security threat mitigation measures and defer other threat mitigation measures to more convenient times or indefinitely.

For example, consider the following scenario:
  Vulnerability 1—Root vulnerability in Cisco® firmware in rev 3.2 of the operating system
  Vulnerability 2—Root vulnerability in Juniper® Firewall in rev 2.1 of the operating system
  Vulnerability 3—Root vulnerability in MySQL
  Malware Exploit 1—Exposes Cisco® firmware vulnerability and places backdoor
  Malware Exploit 2—Uses backdoor of Cisco® to execute a backdoor to vulnerability in
  Juniper®
  Malware Exploit 3—Once past firewall, exfiltrates data from a MySQL database using Vulnerability 3

A typical, or at least ideal, response might be to mitigate all three vulnerabilities with software patches/upgrades to all three of the Cisco, Juniper, and MySQL. However this solution, may impose short term performance costs and in practice a system administrator may choose to defer mitigation measures due to service impact and thus only some or none of the vulnerabilities may actually get patched. A better solution may be to identify this kill chain and select a network security threat mitigation/remediation measure that addresses a sufficient subset of the detected vulnerabilities to break the kill chain and thus avoid the more critical risks that the kill chain poses. An orchestration may then be recommended or invoked that blocks the kill by breaking the kill chain (e.g., by applying a single patch to a single firewall) and then gradually remediating remaining network security vulnerabilities over time.

For example, machine learning techniques may be applied to the network security threat information to identify an adverse reaction of a specific set of attacks could have in sequence with a specific set of infrastructure corresponding to a kill chain that could compromise the security of a private computing network. An orchestration based on this learned or identified kill chain may then be applied in a targeted response so as to, for example, instead of patching everything, patch only those systems in the learned kill chain.

The example technique 500 includes transmitting 550 alert messages that include at least some of the network security threat information describing the network security threat to the customer instances (e.g., customer 1 instance 360, customer 2 instance 362, and customer 3 instance 364). The network security threat information may identify a network security threat (e.g., malware or a malicious external host). For example, the alert messages may be transmitted 550 by a central instance (e.g., security operations shared instance 320) to one or more customer instances (e.g., 360, 362, and 364) running on one or more application servers (e.g., the application server 112) operating in the provider datacenter 108, outside of the private network(s) (e.g., customer 1 network 330, customer 2 network 332, or customer 3 network 334) associated with the customer instances. For example, the alert messages may be transmitted 550 using a network interface (e.g., the network communication unit 218).

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. For example, the technique 500 may be augmented to include training a machine learning module (e.g., a neural network) to classify combinations of network security vulnerabilities reflected in network security threat information as a kill chain or not. Furthermore, one or more aspects of the systems and techniques described herein can be omitted. For example, the transmitting 520 a search query may be omitted and members of a group (e.g., through their customer instances) may initiate sightings searches in their respective private networks on their own initiative and send obtained search results to a central instance for analysis and/or distribution to the group.

Figure 6C:
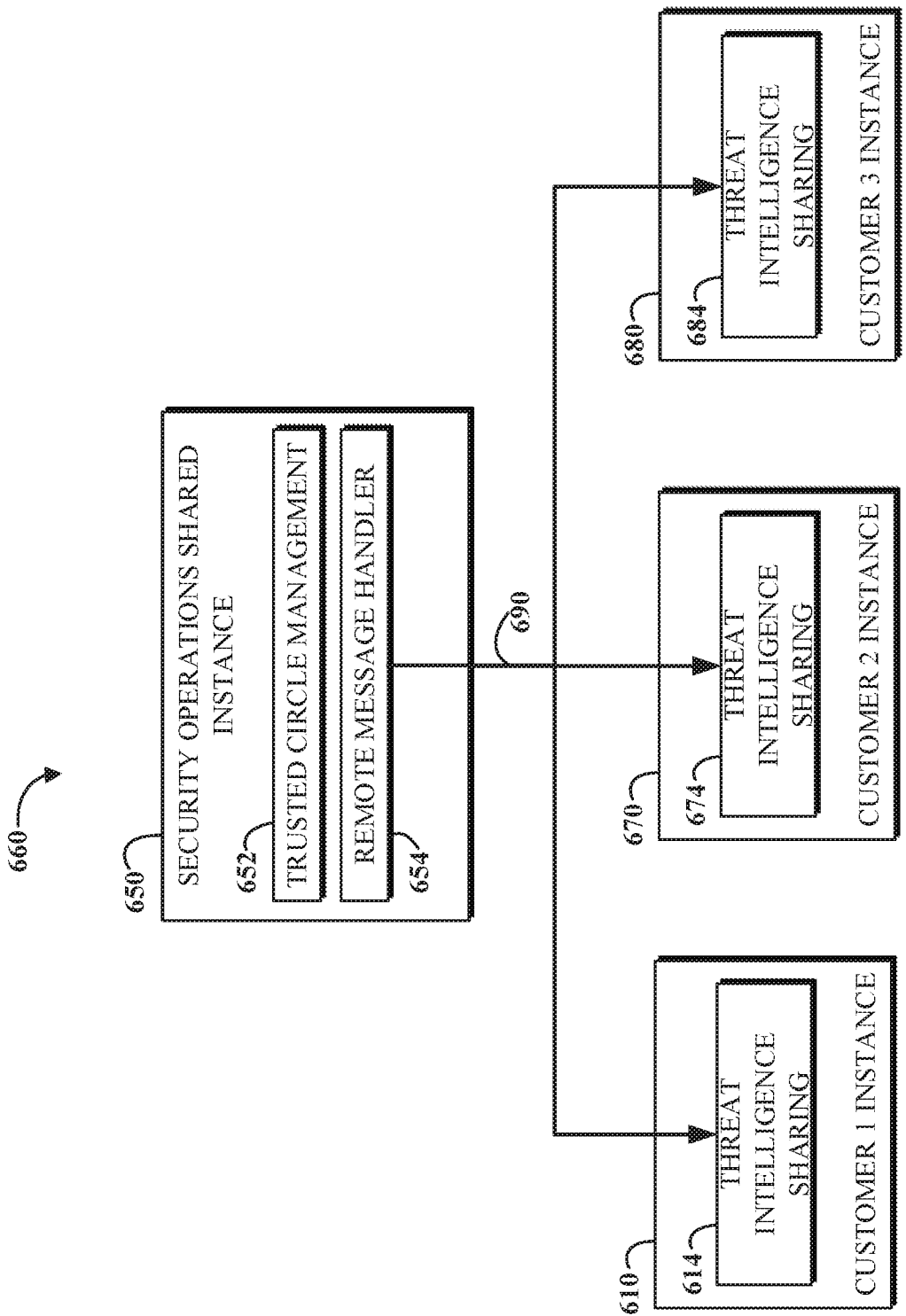

FIGS. 6A-C are block diagrams of example systems configured to perform a sequence of operations to conduct sightings searches of multiple private networks using a shared search query. In a first operation (illustrated in FIG. 6A), a user initiates a search query locally to check whether a piece of network security threat intelligence (e.g., one or more observables) is present in a corresponding first customer network (e.g., by checking log stores for the customer network. In a second operation (illustrated in FIG. 6B), the search query is shared with a group (e.g., a trusted circle) to determine whether any other members of the group have relevant information in their private network(s). The request and any responses may be sent as messages to a central instance. In a third operation (illustrated in FIG. 6C), the central instance sends messages to members of the group (e.g., trusted circle) that include the shared search query with request to conduct a sightings search in their respective private networks. The central instance may also enforce anonymity and/or attribution policies while distributing information (including the shared search query) to members of the group.

FIG. 6A is a block diagram of an example system 600 configured to conduct sightings searches of private networks. FIG. 6A illustrates an example scenario where the system 600 is used to conduct a sightings search of a private network. The system 600 includes customer 1 instance 610, which manages network security operations for customer 1 network 620. Customer 1 instance 610 includes a sightings search integration module 612 that is configured to integrate with network security related resources, such as SIEM 624 in customer 1 network 620 to conduct sightings searches of data for customer 1 network 620. Customer 1 network 620 also includes an agent device 622 that customer 1 instances may control to conduct portions of a sightings search from within customer 1 network 620. In the example scenario, sightings search integration module 612 sends a search query 630 to the agent device 622, which in turn executes a native query 632 based on the search query against the SIEM 624. The agent device 622 receives search results 634 from the SIEM 624 and in turn sends data 636 based on the search results 634 (e.g., a copy of the search results 634, a subset of the search results 634, and/or a summary of the search results 634) back to the sightings search integration module 612.

FIG. 6B is a block diagram of an example system 640 configured to request, via communications with a central instance, that a sightings search be expanded to additional private networks corresponding to a group. FIG. 6B illustrates an example scenario where the system 640 is used to share a search query with a group (e.g., a trusted circle) to determine whether any other members of the group have relevant information in their private network(s). The system 640 includes customer 1 instance 610 and security operations shared instance 650 that is configured to manage trusted circles and share network security threat information among members of a trusted circle. Customer 1 instance 610 includes a threat intelligence sharing module 614 (e.g., implemented as a plugin) that communicates with security operations shared instance 650. Security operations shared instance 650 includes a trusted circle management module 652 that manages groups of private networks established to share network security information. Security operations shared instance 650 includes a remote message handler module 654 that manages communications with customer instances registered for members of the groups. In the example scenario, threat intelligence sharing module 614 sends a threat intelligence query message 656 to the remote message handler module 654 for distribution to members of a group. For example, the threat intelligence query message 656 may include a search query (e.g., including one or more observables) that customer 1 instance 610 is requesting be used by other customer instances associated with a group to search network security threat intelligence in their respective private networks. For example, threat intelligence query message 656 may be sent at the direction of a user (e.g., a system administrator of customer 1 network 620) of the customer 1 instance 610.

FIG. 6C is a block diagram of an example system 660 configured to forward a shared search query to customers instances for members of a group to expand a sightings search to cover multiple private networks. FIG. 6C illustrates an example scenario where the system 660 is used to share a search query with a group (e.g., a trusted circle) to determine whether any other members of the group have relevant information in their private network(s). The system 660 includes security operations shared instance 650 and customer instances (610, 670, and 680) that are registered with security operations shared instance 650 as associated with respective members of a trusted circle (group) that is maintained by security operations shared instance 650. The customer instances (610, 670, and 680) include respective threat intelligence sharing modules (614, 674, and 684) (e.g., implemented as a plugin) that communicate with security operations shared instance 650. Security operations shared instance 650 includes trusted circle management module 652 and remote message handler module 654. In the example scenario, a shared search query 690 is sent to the customer instances (610, 670, and 680) corresponding to members of a trusted circle. The shared search query 690 is sent by remote message handler module 654 in messages to the customer instances (610, 670, and 680). The customer instances (610, 670, and 680) may subsequently perform sightings searches based on the shared search query 690 in their respective private networks in response to receiving the shared search query 690. For example, the customer instances (610, 670, and 680) may implement the technique 400 of FIG. 4 in response to the shared search query 690.

Figure 7:
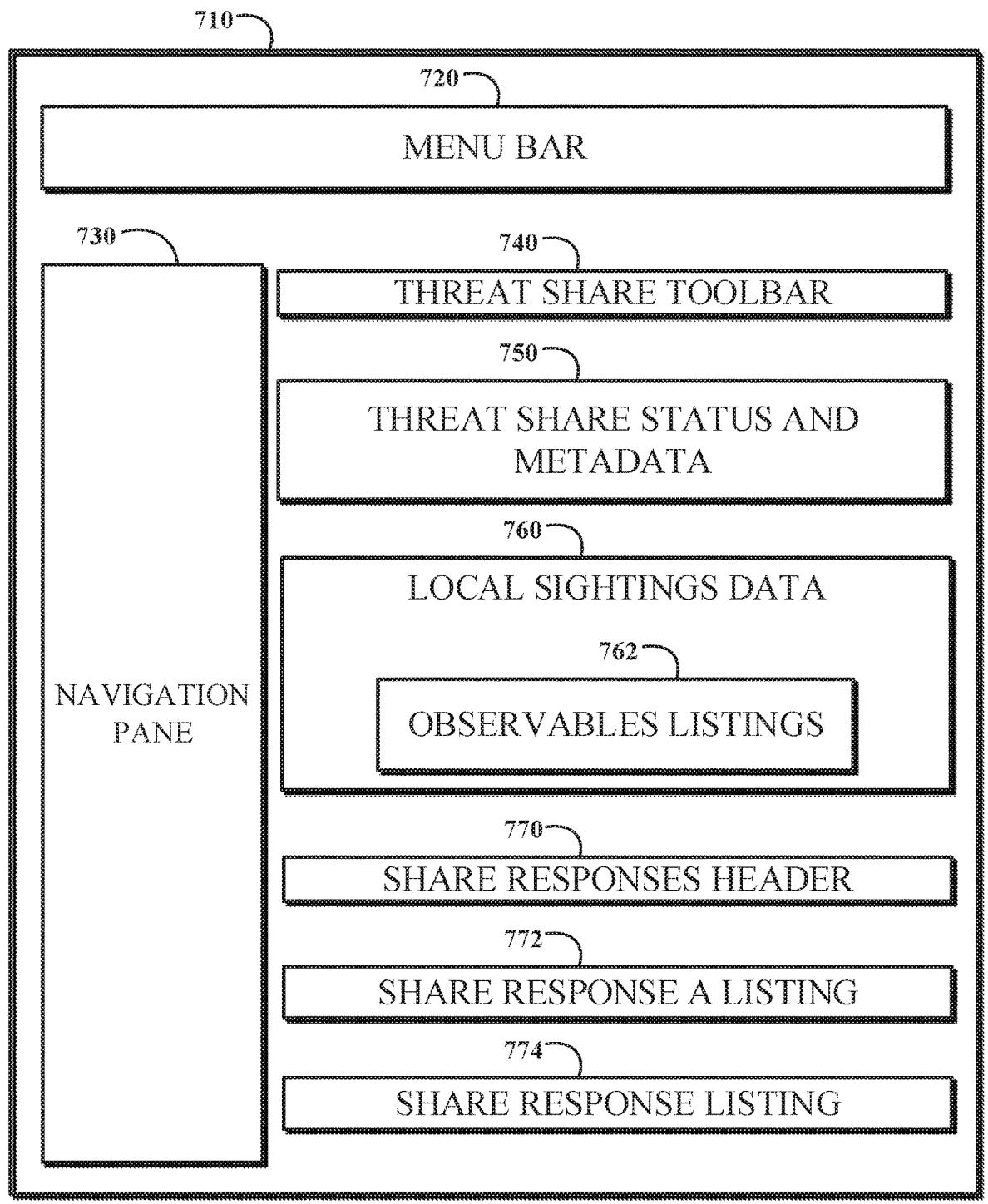
FIG. 7 is a diagram of an example display region generated for presenting information about a network security threat, including related observables and shared responses from other networks in a group of networks.

FIG. 7 is a diagram of an example display region 710 generated for presenting information about a network security threat, including related observables and shared responses from other networks in a group of networks. The display region 710 includes a menu bar 720; a navigation pane 730; a threat share toolbar 740; threat share status and metadata 750; local sightings data 760, including an observables listings 762; a share responses header 770; and share response listings 772 and 774. For example, the display region 710 may be generated by the user interface 220 of FIG. 2.

The menu bar 720 may include a user icon reflecting the status of a currently logged in user, a search icon, a chat icon, a help icon, a setup icon, and an options icon. The navigation pane 730 may include a search box, a favorites icon, and a site map or tree. The threat share toolbar 740 may include a threat share selection icon with a drop-down menu for selecting recently viewed network security threat share requests. An example of a threat share request may be threat intelligence query message 656 of FIG. 6C. The threat share toolbar 740 may also include an attachment icon for uploading files, a settings icon, an update icon for pulling the latest data for the threat share request from a database (e.g., database 118), a delete icon, a next threat share request icon, and a previous threat share request icon.

The threat share status and metadata 750 displays numerous fields of information about the threat share request. The threat share status and metadata 750 may display a name or other identifier for the network security threat share request; a name of the group (e.g., a trusted circle) in which the threat share request has been made; identification (e.g., a user name or "anonymous") of a profile associated with a group member that made the request; and a short description string (e.g., "we saw the attached observables performing port scanning of some of our systems"). The threat share status and metadata 750 portion of the display region 710 may enable users to view and/or edit some of the status and information and metadata for the threat share request, depending on permissions associated with the user.

The local sightings data 760 may include observable listings 762 that presents a table of observables associated with the threat share request with fields that may include an identifier (e.g., a name), an observable type classification (e.g.; IP address or URL), and/or one or more values or links to associated attachments for the observables. The local sightings data 760 may also include a view of data reflecting occurrences of the observables (e.g., occurrence counts, occurrence histograms, and/or a list of impacted hosts in the local private network) that have been found a local private network associated with the user viewing the display region 710.

The share responses header 770 may list column headings that may include names for attributes of share responses that are displayed in the area of the display region 710 below the share responses header 770. The share responses header 770 may also include icons for creating a new threat share response and for performing other actions, such as sorting the share response listings 772 and 774. The area of the display region 710 below the share responses header 770 may include one or more share response listings for responses from group members to the threat share request. In this example, two share response listings 772 and 774 are displayed below the share responses header 770. The share response listings 772 and 774 may display values of attributes of corresponding share response. For example, a share response listing (e.g., share response A listing 772 or share response B listing 774) may include a date and time when the share response was received or associated with the threat share request; identification (e.g., a user name or "anonymous") of a profile associated with a group member that submitted the response; an identifier (e.g., a name and/or a value) of an observable found; and a count of sightings.

Figure 8:
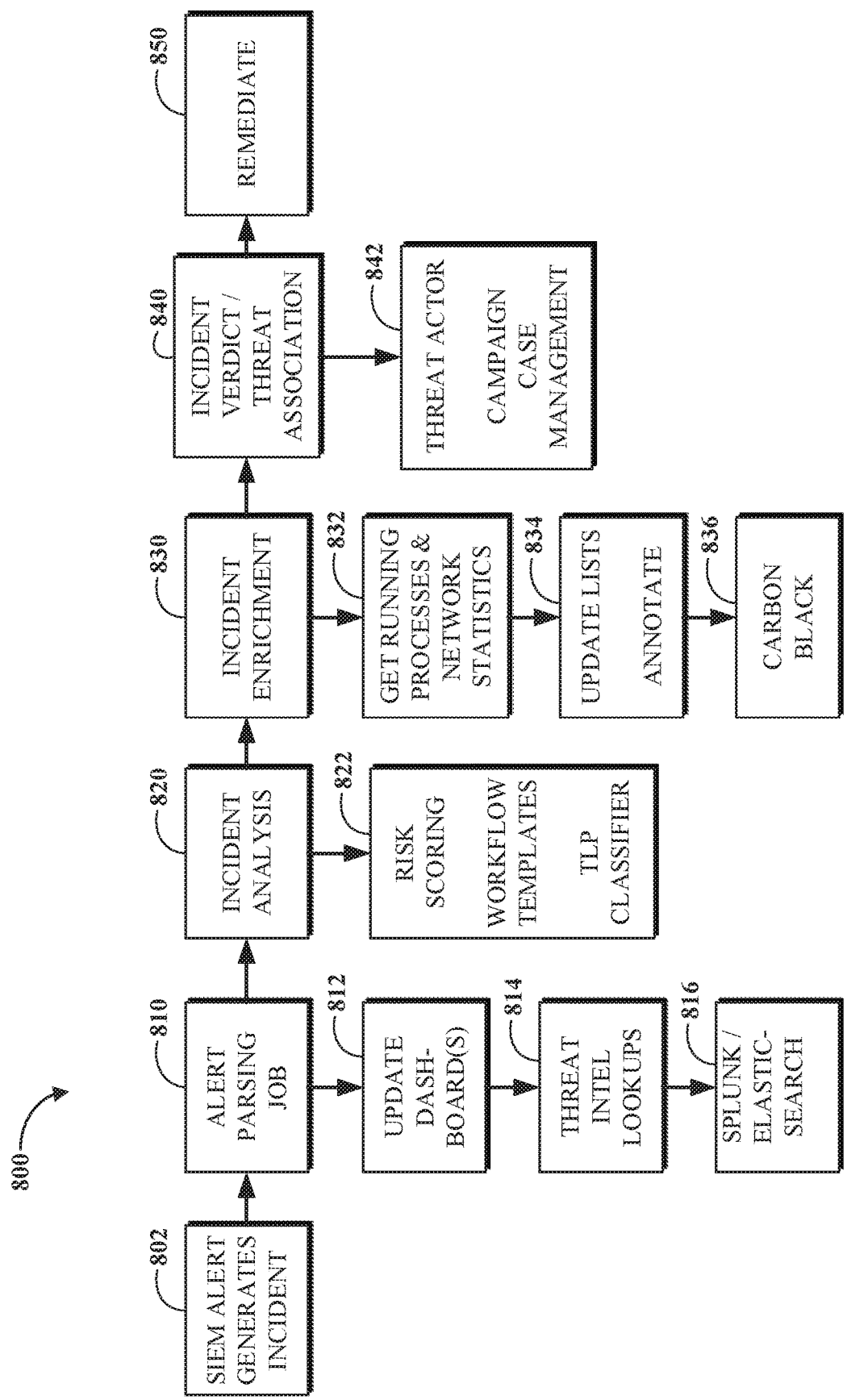
FIG. 8 is a block diagram of an example end-to-end incident response workflow.

FIG. 8 is a block diagram of an example end-to-end incident response workflow 800. The example workflow 800 starts when an SIEM (e.g., SIEM 350) outputs an alert and network security incident is generated 802 in response to the alert. The alert from the SIEM is parsed 810 to extract information and populate fields of a network security incident record. For example, embedded URLs and indicators of compromise (IoCs) may be extracted from the alert and attachments to the alert may be retrieved and processed. One or more dashboards (e.g., a network security monitoring dashboard) may be updated 812 based on the occurrence of the network security incident and/or properties of the network security incident extracted from the alert. For example, a count of open network security incidents in a network security dashboard may be updated 812. Threat intelligence look-ups may be conducted 814. For example, a search query may be formed based on one or more observables from IoCs in the alert, and this search query may be used to conduct a local sightings search in the private network being managed. The search query may also be shared with a central instance (e.g., as described in relation to the example scenario of FIGS. 6A-C) to request that sightings searches be performed in other private networks in a group (e.g., a trusted circle). Log stores, such as Splunk or Elasticsearch, for the local private network may be accessed 816 to retrieve data that may be relevant to the network security incident (e.g., data reflecting occurrences of observables from IoCs of the alert.

The example workflow 800 includes analyzing 820 the collected data for the network security incident to prioritize, assign, and categorize the network security incident. At operation 822, additional information about the network security incident is generated based on the analysis 820, including: a risk score (e.g., determining a number that may be indicative of the risk and possible impact of the network security incident); a workflow template may be generated to present to a user (e.g., a system administrator for the private network) as a suggested response to the network security incident. For example, a workflow template may be edited and/or used by a user to respond to the network security incident. A Traffic Light Protocol (TLP) classification may be determined for the network security incident to specify how data about the network security incident will distributed.

The example workflow 800 includes incident enrichment 830, which may include getting 832 running processes and network statistics, updating and/or annotating 834 lists (e.g., whitelists and/or blacklists) associated with the network security incident. The workflow 800 may also include running orchestration and utilizing third party incident response tools, such as Carbon Black at operation 836.

The example workflow 800 includes incident verdict and threat association at operation 840. At operation 842, a network security threat actor may be identified and campaign case management may be commenced. At operation 850 additional network security threat mitigation/remediation measures (e.g., updating or uninstalling software or modifying firewall rules) may be applied.

In some implementations, machine learning techniques may be applied to automated workflow decision making. For example, replay—"You usually do 'X' in this scenario, would you like to do it again?" recommend new actions based on learned tactics and procedures "You've never done this before, but "we" know what this situation is and recommend you do 'X'". For example, a machine learning engine may take positive/negative input from users and from monitors of resulting orchestration to rate effectiveness and likelihood of applicability. In some implementations, IT data (e.g., from a configuration management database) may be combined with the security data to monitor effectiveness and cause/effect relationships.

An important aspect of computer security is prediction/ identification of the TTP (threat, tactic, procedure) being used during an attack on a computing network. Without the TTP—responses may be adhoc and trial-and-error until threat is contained. With a connected network of enterprises we can learn what attacks are manifesting, what others are doing in their response, and build a targeted workflow (e.g., Vulnerability -> Assets -> Active Exploit -> Patch/Block/Isolate) which can then be shared and applied in multiple private networks.

Temporary orchestrations may be employed in some circumstances to mitigate an immediate network security threat until the network security threat abates or is permanently mitigated (e.g., by a patch of software installed in a network to remove a vulnerability). In some implementations, remediation may be temporarily orchestrated based on community factors, 3rd party information, or other information available at the time, resulting in remediation measures that can be deployed quickly but may impose significant burdens on performance and usability of resources in the network under management. For example, a network under management or a separable subset of the network may be temporarily isolated (e.g., using draconian firewall rules) from external computing resources during the early stages of an incident concerning a network security threat in order to quickly cast a wide scope of protection on the most valuable components of the network. These temporary network security threat mitigation measures may significantly inhibit the use network components being isolated. For example, user may continue to be able to access internal systems, but general access to the Internet might be disabled, thus limiting the scope of tasks that can be performed using these network resources.

A temporary orchestration may remove or adjust (e.g., automatically or by suggesting an action to a system administrator that is confirmed) a temporary network security threat mitigation measure after more information becomes available (e.g., through shared network security threat intelligence) and/or the status of the computing resources in the network changes (e.g., through a patch of software or another network change operation). A temporary orchestration may provide important benefits, including enabling successive narrowing of the scope of orchestration to situationally appropriate scope, based on additional information about the environment as it is learned (e.g., using the system 300 of FIG. 3). As more 3rd party information (e.g., network threat intelligence) arrives, temporary orchestration may continue with mitigation measures that are more specific in nature have less deleterious impact on the operation of the computing resources of the network. In the earlier example, a successive network security threat mitigation measure invoked using temporary orchestration may block just a few specific websites (e.g., websites identified in newly received network security threat intelligence messages) rather than the whole Internet. In some implementations, temporary orchestration may enable the use of effective network security threat mitigation measure that minimize negative impacts on the performance and use of computing resources in a network under management.

An implementation of this disclosure is a system for obtaining network security threat information. The system includes a means for receiving a message from a central instance; a means for, from a computing device that is connected to a network that is outside of a private network, invoking a search of data associated with the private network, wherein the search is based on the message and the search is performed by an agent device within the private network; a means for receiving a search result of the search from the agent device; a means for transmitting data that is based on the search result to the central instance, wherein the central instance is configured to generate network security threat information based in part on the data that is based on the search result and share the network security threat information with a plurality of customer instances that are associated with a group of customers; and a means for receiving an alert message from the central instance, wherein the alert message includes the network security threat information that identifies a network security threat.

All or a portion of the implementations of the systems and techniques described herein can be implemented using a multi-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a memory; and
one or more processors, wherein the memory includes instructions that, when executed, are configured to cause the one or more processors to:
implement a plurality of customer instances within a datacenter, wherein each customer instance of the plurality of customer instances is associated with a respective customer network of a plurality of customer networks outside of the datacenter;
implement a central instance within the datacenter, wherein the central instance is communicatively coupled to the plurality of customer instances;
receive, at a first customer instance of the plurality of customer instances, an alert from a first customer network of the plurality of customer networks, wherein the alert is associated with a network security threat;
generate, at the central instance, a search query based on one or more observable s associated with the alert;
invoke, at a second customer instance of the plurality of customer instances, a search of data of a second customer network associated with the second customer instance based on the search query;
receive, at the second customer instance, a search result based on the search of data of the second customer network, wherein the search result reflects occurrences of the one or more observables in the second customer network;
conduct, at the central instance, incident analysis comprising:
identifying a kill chain based on the search result, wherein the kill chain comprises a combination of related security vulnerabilities that leads to possible network security compromise; and
determining a risk score associated with the network security threat based on the occurrences of the one or more observables associated with the search result;
conduct, at the plurality of customer instances, incident enrichment comprising determining running processes and network statistics associated with the plurality of customer networks;
conduct, at the central instance, threat association comprising identifying a network security threat actor associated with the alert based at least in part on the kill chain and the search result that reflects the occurrences of the one or more observables in the second customer network;
determine, at the plurality of customer instances, security threat remediation by selecting a remediation measure to break the kill chain;
implement the remediation measure to block communication with the network security threat actor based at least in part on the incident analysis, the incident enrichment, and the threat association; and
transmit a recommendation to the second customer instance based on the security threat remediation.

2. The system of claim 1, wherein invoking the search of data comprises communicating with an agent device to conduct a search within the second customer network.

3. The system of claim 1, wherein invoking the search of data comprises querying a security information and event management database of the second customer network.

4. The system of claim 1, wherein the instructions, when executed, are configured to cause the one or more processors to:
input, via the second customer instance, data pertaining to the occurrences of the one or more observables to a neural network or a support vector machine; and
determine the risk score based on a resulting output of the neural network or the support vector machine.

5. The system of claim 1, wherein conducting incident enrichment comprises updating a white list, a black list, a firewall rule, or any combination thereof.

6. The system of claim 1, wherein the instructions, when executed, are configured to cause the one or more processors to cause the central instance to relay a message comprising the search query to the second customer instance based on the alert.

7. A method, comprising:
receiving, at a first customer instance of a plurality of customer instances, an alert from a first customer network of a plurality of customer networks, wherein the alert is associated with a network security threat;
generating, at a central instance communicatively coupled to the first customer instance, a search query based on one or more observables associated with the alert;
invoking, at a second customer instance of the plurality of customer instances, a search of data of a second customer network associated with the second customer instance based on the search query;
receiving, at the second customer instance, a search result based on the search of data of the second customer network, wherein the search result reflects occurrences of the one or more observables in the second customer network;
performing, at the central instance, incident analysis comprising:
identifying a kill chain based on the search result, wherein the kill chain comprises a combination of related security vulnerabilities that leads to possible network security compromise; and
determining network security threat information comprising a risk score associated with the network security threat based on the occurrences of the one or more observables associated with the search result;
performing, at the plurality of customer instances, incident enrichment comprising determining running processes and network statistics associated with the plurality of customer networks;

conducting, at the central instance, threat association comprising identifying a network security threat actor associated with the alert based at least in part on the kill chain and the search result that reflects the occurrences of the one or more observables in the second customer network;

determining, at the plurality of customer instances, security threat remediation by selecting a remediation measure to break the kill chain;

implementing the remediation measure to block communication with the network security threat actor based at least in part on the incident analysis, the incident enrichment, and the threat association; and transmitting a recommendation to the second customer instance based on the security threat remediation.

8. The method of claim 7, comprising:

invoking, at a third customer instance of the plurality of customer instances, an additional search of data of a third customer network associated with the second customer instance based on the search query; and receiving, at the third customer instance, an additional search result based on the additional search of data of the third customer network, wherein the additional search result reflects the occurrences of the one or more observables in the third customer network.

9. The method of claim 8, wherein performing the incident analysis comprises determining the risk score associated with the network security threat based on the occurrences of the one or more observables associated with the search result and the additional search result.

10. The method of claim 7, comprising invoking a threat mitigation measure using a framework configured to interface to a plurality of network security products provided by a plurality of software publishers, wherein determining the security threat remediation is based on the threat mitigation measure.

11. The method of claim 7, comprising transmitting, via the central instance, an alert message to a third customer instance of the plurality of customer instances, wherein the alert message comprises the network security threat information.

12. The method of claim 7, wherein invoking the search of data comprises communicating with an agent device of the second customer network to query a security information and event management database of the second customer network.

13. A system, comprising:

a memory; and one or more processors, wherein the memory includes instructions that, when executed, are configured to cause the one or more processors to:

implement a plurality of customer instances within a network, wherein the plurality of customer instances is associated with respective private networks of a plurality of private networks that are outside of the network;

implement a central instance within the network, wherein the central instance is communicatively coupled to the plurality of customer instances;

receive, at a first customer instance of the plurality of customer instances, an alert from a first private network of the plurality of private networks, wherein the alert is associated with a network security threat;

generate, at the central instance, a search query based on one or more observable s associated with the alert;

invoke, at a second customer instance of the plurality of customer instances, a search of data of a second private network associated with the second customer instance based on the search query;

receive, at the second customer instance, a search result based on the search of data of the second private network, wherein the search result reflects occurrences of the one or more observables in the second private network;

conduct, at the central instance, incident analysis comprising identifying a kill chain based on the search result, wherein the kill chain comprises a combination of related security vulnerabilities that leads to possible network security compromise;

conduct, at the plurality of customer instances, incident enrichment comprising determining an orchestration based on the kill chain, wherein the orchestration comprises one or more remediation measures;

conduct, at the central instance, threat association comprising identifying a network security threat actor associated with the alert based on the kill chain and the search result that reflects the occurrences of the one or more observables in the second private network;

determine, at the plurality of customer instances, security threat remediation by selecting a remediation measure from the orchestration to break the kill chain;

implement the remediation measure to block communication with the network security threat actor based at least in part on the incident analysis, the incident enrichment, and the threat association; and transmit a recommendation to the second customer instance based on the security threat remediation.

14. The system of claim 13, wherein the remediation measure comprises a software patch to be applied to a component associated with the kill chain.

15. The system of claim 13, wherein the instructions, when executed, are configured to cause the one or more processors to determine an additional security threat remediation based at least in part on the implementation of the security threat remediation.

16. The system of claim 13, wherein conducting incident enrichment comprises determining running processes and network statistics associated with the first private network.

* * * * *